United States Patent [19]
McDermott

[11] Patent Number: 5,740,410
[45] Date of Patent: Apr. 14, 1998

[54] STATIC CLOCK GENERATOR

[75] Inventor: Mark W. McDermott, Austin, Tex.

[73] Assignee: Cyrix Corporation, Richardson, Tex.

[21] Appl. No.: 573,172

[22] Filed: Dec. 15, 1995

[51] Int. Cl.⁶ .................................................. G06F 1/08
[52] U.S. Cl. ........................................ 395/556; 327/113
[58] Field of Search ................................ 395/555, 556, 395/559, 560; 331/57; 327/107, 113, 119, 164, 291

[56] References Cited

U.S. PATENT DOCUMENTS

| | | | |
|---|---|---|---|
| 4,231,104 | 10/1980 | St. Clair | 395/555 |
| 5,167,024 | 11/1992 | Smith et al. | 395/375 |
| 5,175,453 | 12/1992 | Chang et al. | 327/276 |
| 5,448,205 | 9/1995 | Rothermel | 331/57 |

FOREIGN PATENT DOCUMENTS 0 368 144  5/1990  European Pat. Off. ........... G06F 1/32

*Primary Examiner*—Dennis M. Butler
*Attorney, Agent, or Firm*—Andrew S. Viger; John L. Maxin

[57] ABSTRACT

A processing system includes clock circuitry that statically multiplies/divides a stimulus signal which can then be removed while a resultant product clock is still generated. A cascaded—dual tap delay line is employed having a single phase inversion which is looped back and logically ORed with the first edge of the stimulus signal to induce oscillation. A multiplier/divisor control signal adjusts the "N" times multiplication by disabling the loop after the desired number of pulses is achieved within the period of the stimulus signal. 1/M multiplication is achieved by disabling the loop from oscillating for M stimulus clocks. Multiple frequencies can be dynamically realized on-the-fly without resynchronization by combining delayed clock pulses with a multiplexer.

5 Claims, 13 Drawing Sheets

STATIC CLOCK GENERATOR

CROSS-REFERENCES TO RELATED APPLICATIONS

This patent is related to commonly assigned U.S. patent application Ser. No. 08/572,947, entitled "Clock Synchromesh", Applications Ser. No. 08/572,947, entitled "Distributed Clock Generator", Ser. No. 08/572,813, entitled "Selectable Clock Generator Mode", Ser. No. 08/572,948, entitled "Prefetch Unit With A Three-Block Prefetch Buffer And Virtual Buffer Management Including Selectively Allocating A Prefetch Buffer For A Branch Target Or The Not-Predicted Path", Ser. No. 08/572,773, entitled, "Detecting Short Branches In A Prefetch Buffer Using Target Location Information In a Branch Target Cache", Ser. No. 08/572,815, entitled, "Branch Target Cache Storing The L1 Cache Index For A Target", Ser. No. 08/572,949, entitled, "Detecting Segment Limit Violations For Branch Targets When The Branch Unit Does Not Supply The Linear Address", and Ser. No. 08/572,996, entitled, "Detecting Self-Modifying Code In A Pipelined Processor With Branch Processing And Store Buffering", all filed contemporaneously herewith and the disclosures herein incorporated by reference.

BACKGROUND OF THE INVENTION

1. Field of the Invention

The invention relates generally to integrated circuits, and more particularly to systems and methods of clock generation in very large scale integrated circuitry, such as a microprocessor.

2. Description of Related Art

Synchronous integrated circuits, such as a microprocessor, continue to make advances in transistor integration and operational speed. Moreover, process technology advancements have led to increases in both die size and yields. Increased integration and faster operational speeds however, have led to clock skew and power dissipation problems. In this regard, elaborate clock schemes have been employed to reduce power consumption which remove the clock signals during "dormant" periods of processor activity.

One problem with removing clock signals is that phase locked-loop (PLL) circuits, which are typical used to synthesize de-skewed clocks within the processor, fall out of lock. Accordingly, the latency associated with bringing the PLL circuits back in lock is simply unacceptable in a high performance system.

By way of further background, it is desirable to maintain synchronous operation at harmonic and subharmonic levels between functional units within the processor. That is, it is beneficial from a power conservation standpoint, to operate some of the functional units at a lower frequency which for a particular operation, does not impact performance. However, for other operations, these functional units must be instantly clocked at a higher frequency in order not to sacrifice performance. Unfortunately, pure PLL circuits do not respond well to the requirement of substantial instantaneous change in frequency.

Accordingly, there is a need for a system and method of statically generating clock signals independent of a stimulus clock frequency, which can change frequency on-the-fly without imposing any latency limitations.

SUMMARY OF THE INVENTION

To overcome the limitations of the prior art described above, and to overcome other limitations that will become apparent upon reading and understanding the present specification, the present invention discloses a computing system and method having a static clock generator that statically multiplies/divides a stimulus signal which can then be removed while a resultant product clock is still generated. The stimulus signal is passed through a cascaded—dual tap delay line having a single phase inversion which is looped back and logically ORed with the first edge of the stimulus signal to induce oscillation. A multiplier/divisor control signal adjusts the "N" times multiplication by disabling the loop after the desired number of pulses is achieved within the period of the stimulus signal. 1/M multiplication is achieved by disabling the loop from oscillating for M stimulus clocks. Multiple frequencies can be dynamically realized on-the-fly without resynchronization by combining delayed clock pulses with a multiplexer.

It is an object of the present invention therefore, to provide a system and method of statically generating clock signals from a single stimulus edge which can then be removed without impacting oscillation.

It is a further object of the present invention to provide a system and method of statically generating clock signals which can change frequencies on-the-fly without resynchronization and without inducing latency into the system.

These and various other objects, features, and advantages of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a specific example of a distributed clock generator in a computing system, practiced in accordance with the present invention.

BRIEF DESCRIPTION OF THE DRAWINGS

Referring now to the drawings in which like reference numerals and letters indicate corresponding elements throughout the several views:

FIG. 12 is a more detailed block diagram of the control circuitry depicted in FIG. 2a;

FIG. 14 is a more detailed block diagram of the branch prediction unit of the processor depicted in FIG. 2a;

DESCRIPTION OF THE PREFERRED EMBODIMENTS

Figure 1:
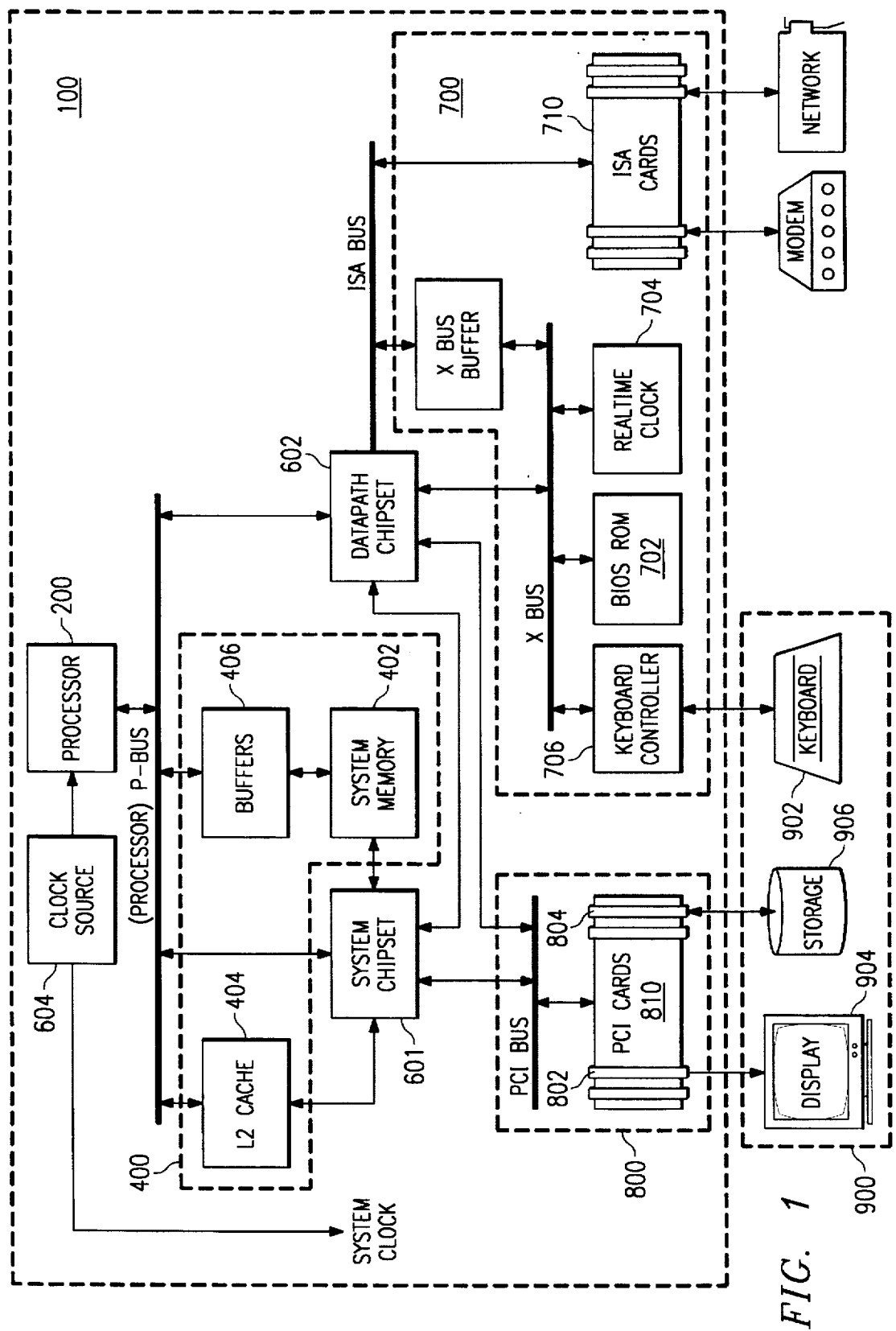
FIG. 1 is a block diagram of an exemplary computing system practiced in accordance with the principles of the present invention.

The detailed description of the preferred embodiment for the present invention is organized as follows:

1. Exemplary Computing System
   1.1 Exemplary Processor
2. Clock Generation And Distribution
   2.1 Selectable Clock Generation Mode
   2.2 Static Clock Generation
3. Reconstitutors
   3.1 Distributed Clock
4. Clock Synchromesh Operation
   4.1 Software Control
   4.2 Bus Activity Control
   4.3 Internal Heuristic For Idle Cycles
5. Prefetch Buffer
6. Branch Loop Detection
7. Conclusion This organizational table, and the corresponding headings used in this detailed description, are provided for the convenience of reference only and are not intended to limit the scope of the present invention. It is to be understood that while the preferred embodiment is described hereinbelow with respect to the x86 computer architecture, it has generally applicability to any architecture. Certain terminology related to the x86 computer architecture (such as register names, signal nomenclature, etc.) which is known to practitioners in the field of processor design, is not discussed in detail in order not to obscure the disclosure.

Moreover, structural details which will be readily apparent to those skilled in the art having the benefit of the description herein have been illustrated in the drawings by readily understandable block representations and flow diagrams, showing and describing only those details that are pertinent to the present invention. The block and flow diagrams in the figures do not necessarily represent the physical arrangement of the exemplary system, but are primarily intended to illustrate the major structural components in a convenient functional grouping, wherein the present invention may be more readily understood. It is to be understood that other embodiments may be utilized and structural changes may be made without departing from the scope of the present invention.

The term "synchromesh" is used throughout the specification to mean a mechanism for translating clock frequency in relation to the criticality of activity—analogous to an automatic transmission translating torque/speed in an automobile.

1. Exemplary Computing System

FIG. 1 illustrates in block diagram form, an exemplary computer system including a system circuit board (a.k.a. motherboard) 100 and various peripherals and peripheral interfaces. Motherboard 100 includes a processor 200 and memory subsystem 400 intercoupled over a processor P-Bus (sometimes referred to as a CPU or local Bus). System logic circuitry interfaces the processor 200 to three conventional peripheral buses namely: X-Bus, PCI-Bus, and ISA-Bus. System logic circuitry includes a system chipset 601 and a datapath chipset 602, as well as an external clock source 604 that provides an external clock input to the processor 200 and a system clock signal to the remainder of the motherboard 100. The external clock source 604 may take on many forms without departing from the scope of the present invention including a digital or analog phase-locked loop or delay line loop circuitry, the exact details not being necessary for the understanding of the present invention. For the exemplary computer system, the P-Bus is a conventional 486-type 32-bit address and data bus.

Processor 200 and the memory subsystem 400 reside on the P-Bus—the only other direct connections to the P-Bus are the system and datapath chipsets 601 and 602, respectively. According to the exemplary division of system logic functions, the system chipset 601 interfaces to a conventional 32-bit PCI-Bus, while the datapath chipset 602 interfaces to the 16-bit ISA-Bus and the internal 8-bit X-Bus. Alternative embodiments allow for a special VL-Bus direct interface to the P-Bus for video/graphics and other peripherals.

For 32-bit systems with a 32-bit P-Bus, some current system logic designs combine the system and datapath chipset functions into a single chipset. For 64-bit systems with a 64-bit P-Bus, the pin count required by the 64-bit data bus width currently necessitates that the system and datapath chipset functions be split as indicated in FIG. 1.

Processor 200 is coupled over the P-Bus to L2 (level 2) cache 404 and through data buffers 406 to system (DRAM) memory 402. The system chipset 601 includes control circuitry for P-Bus, DRAM, and L2 cache control. The datapath chipset 602 also interfaces to the conventional X-Bus. The X-Bus is an internal 8-bit bus that couples to the BIOS ROM 702 and the RTC (real-time clock) 704. In addition, the X-Bus connects to a conventional 8-bit keyboard controller 706.

The system and datapath chipsets 601 and 602 provide interface control for the 16-bit ISA-Bus and the 32-bit PCI-Bus. The ISA-Bus maintains compatibility with industry standard peripherals, coupling to ISA peripheral card slots 710. The PCI-Bus provides a higher performance peripheral interface for selected peripherals, including coupling to PCI peripheral card slots 810—in particular, a video/graphics card 802 provides a video/graphics interface, while a storage controller 804 (which may be included as part of the system chipset 601) interfaces to mass storage 906.

The motherboard 100 couples through the PCI, ISA, and X Buses to external peripherals 900, such as keyboard 902, display 904, and mass storage 906. Network and modem interconnections are provided as ISA cards, but it is to be understood that they could also be provided as PCI cards.

1.1 Exemplary Processor

Figure 2A:
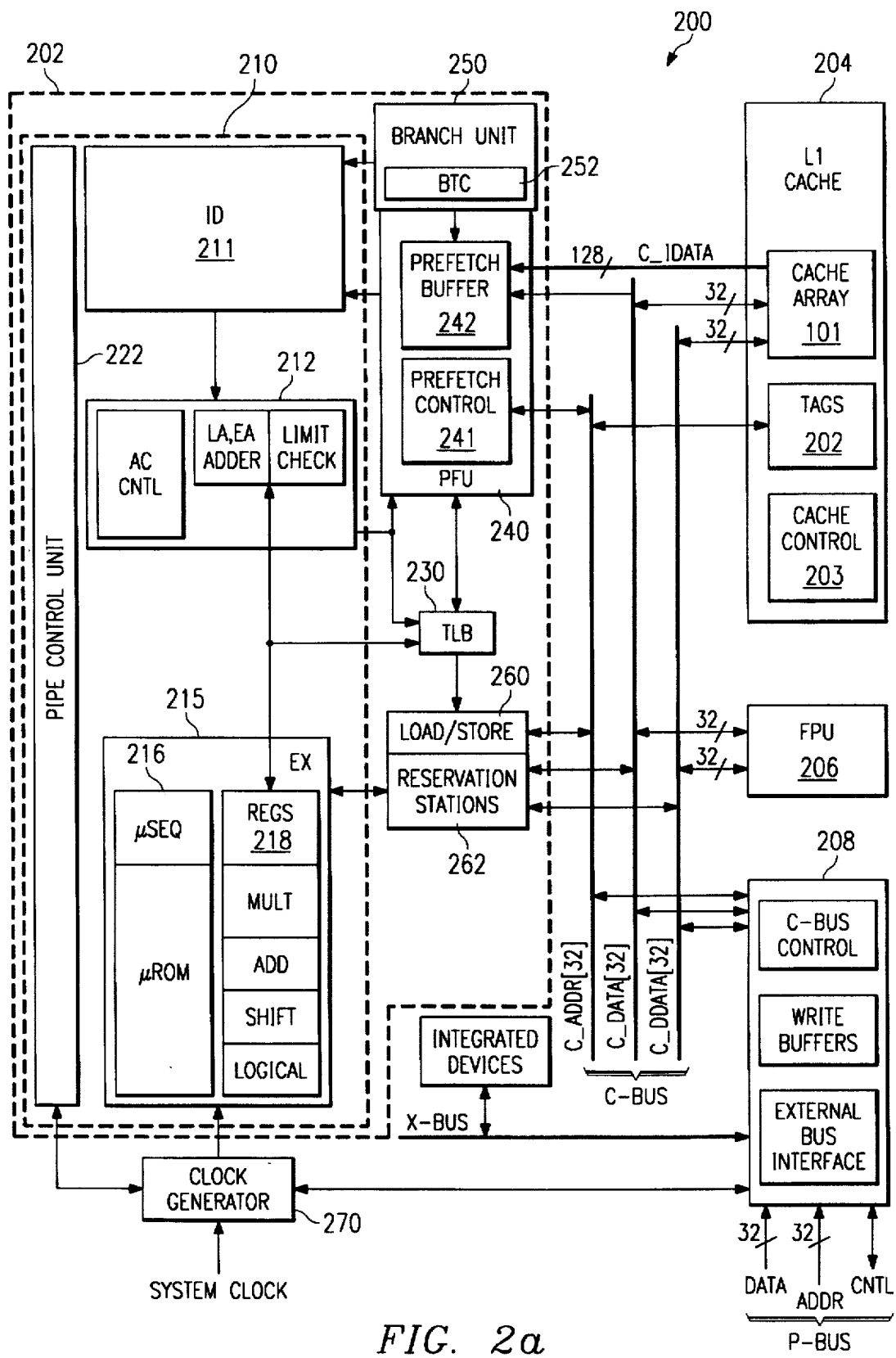
FIGS. 2a–2b are block diagrams of the exemplary processor depicted in FIG. 1.

Referring now to FIG. 2a, exemplary Processor 200 is an x86 processor that uses a modular architecture in which CPU core 202, level one (L1) Cache 204, FPU 206, and Bus Controller (BC) 208 are coupled by an arbitrated C-Bus. The CPU core 202 interfaces to the C-Bus through Prefetch (PFU) and Load/Store (LDST) units 240 and 260, respectively.

Figure 2B:
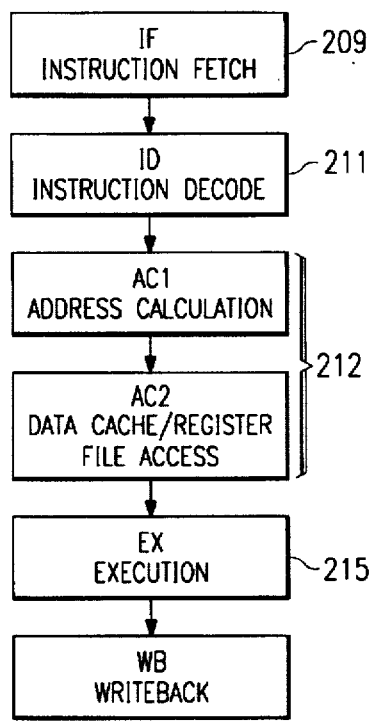

Referring to FIG. 2b, the Processor 200 uses a six stage instruction execution pipeline: Instruction Fetch (IF) 209, Instruction Decode (ID) 211, Address Calculation AC1/AC2 (collectively AC) 212, Execution (EX) 215, and Writeback (WB). The superpipelined AC stage performs instruction operand access—register file access, and for memory reference instructions, cache access.

Referring back to FIG. 2a, CPU core 202 includes an execution core 210 that encompasses the ID 211, AC 212, and EX 215 stages. The PFU 240 performs instruction fetch in conjunction with a Branch Unit (BU) 250, prefetching instruction bytes for ID 211. The LDST unit 260 performs operand loads and result stores for the AC 212, EX 215, and WB stages. A clock generator 270 receives the external system clock from clock source 604 (FIG. 1), and generates internal core and other clocks, including performing clock multiplication and clock throttling, as described in more detail hereinbelow.

Execution core 210 includes an ID stage 211, an AC stage 212, and an EX stage 215. A Pipe Control unit 222 controls the flow of instructions through pipe stages of the execution core, including stalls and pipe flushes.

The EX stage 215 is microcode controlled by a microcontrol unit 216 (microsequencer and microROM) and a general register file 218. The EX stage 215 performs add, logical, and shift functions, and includes a hardware multiplier/divider. Operands are transferred from the register file 218 or Cache (memory) over two source buses S0 and S1, and execution results are written back to the register file 218 or the Cache 204 (memory) over a writeback bus WB.

PFU 240 performs IF 209, fetching instruction bytes from the L1 Cache 204 or external memory through the BC 208, and feeding instruction bytes to ID 211 for decoding. PFU 240 fetches prefetch blocks of sixteen instruction bytes (the currently preferred cache line size) into a three-block prefetch buffers in virtual buffer management scheme is used to allocate physical prefetch buffers in a circular queue (CURR, NEXT, and PREV blocks).

BU 250 supplies prefetch addresses for COF instructions—predicted-taken branches and unconditional changes of flow (UCOFs) (jumps and call/returns). The BU 250 includes a branch target cache (BTC) 252 for branches and jumps/calls and a return stack RSTK (not depicted) for returns—the BTC 252 is accessed with the instruction pointer for the instruction prior to the COF, while the RSTK is controlled by signals from ID 211 when a call/return is decoded. For branches that miss in the BTC 252 (which will then be statically predicted), the PFU 240 will speculatively prefetch along the not-predicted taken path to enable prefetching to switch immediately in case the branch is mispredicted.

ID 211 performs Instruction Decode, decoding one x86 instruction per clock. ID 211 receives eight bytes of instruction data from prefetch buffer 242 each clock, returning a bytes-used signal to allow the prefetch buffer 242 to increment for the next transfer.

Decoded instructions are dispatched to AC 212, which is superpipelined into AC1 and AC2 pipe stages, performing operand access for the EX stage 215. For memory reference instructions (reads or writes), the AC1 stage calculates one linear address per clock (address calculations involving four components require an additional clock), with limit checking being performed in AC2—if paging is enabled, the AC2 stage performs linear-to-physical address translation through a TLB (translation lookaside buffer) 230. Instruction operands are accessed during AC2—for non-memory references, the register file 218 is accessed, and for memory references, the L1 Cache 204 is accessed.

The L1 Cache 204 is virtually indexed and physically tagged such that set selection is performed with the linear (untranslated) address available in AC1, and tag comparison is performed with the physical (translated) address available in AC2, allowing operand accesses that hit in the L1 cache 204 to be supplied by the end of AC2 (the same as a register access). For accesses that miss in the L1 Cache 204, cache control logic 203 initiates an external Bus cycle through the BC 208 to load the operand.

After operand access, the AC stage 212 issues integer instructions to the EX stage 215, and floating point instructions to the FPU 206. The EX stage 215 and the FPU 206 perform the EX and WB stages of the execution pipeline.

The EX stage 215 receives source operands over two source Buses S0/S1 (i) as immediate data passed along with the instruction from AC stage 212, (ii) from the register file 218, and/or for memory references, (iii) from the L1 Cache 204 or external memory through the LDST unit 260. In particular, for memory references that require an external Bus cycle, EX stage 215 will stall until operand load is complete.

Execution results are written back in the WB stage either to the register file 218, or to the Cache (memory)—stores to the Cache (memory) are posted in store reservation stations in the LDST unit 260.

Load/Store (LDST) unit 260 performs operand loads and result stores for the AC/EX stages 212 and 215 respectively. In addition, for branches that miss in the BTC 252, the LDST unit 260 issues prefetch requests for the target. Loads have the highest priority, except in the case of branches that miss in the BTC 252 where the prefetch request for the target is given priority. Four reservation station buffers 262 are used for posting stores—stores can be posted conditionally pending resolution of a branch, retiring only if the branch resolves correctly. Stores are queued in program order—operand loads initiated during AC2 may bypass pending stores.

The L1 (level one) Cache 204 is a 16K byte unified data/instruction cache, organized as 4 way set associative with 256 sets and 4 ways per set, with each way in each set constituting a location for a 16 byte (4 Dword) cache line (i.e., 256×4 cache lines). The L1 Cache 204 can be operated in either write-through or write-back mode—to support a write-back coherency protocol, each cache line includes 4 dirty bits (one per Dword).

BC 208 interfaces to the 32-bit P-Bus, and to two internal Buses-the C-Bus and an X-Bus. Alternatively, the BC 208 can be modified to interface to an external 64-bit data P-Bus (such as the Pentium® Bus defined by Intel Corporation of Santa Clara, Calif.). The BC 208 includes eight write buffers for staging external writes cycle.

The C-Bus (collectively depicted in FIG. 2a as C_ADDR [32], C_DATA[32], AND C_DDATA[32]) is an arbitrated bus that interconnects the execution core 210, PFU 240, LDST unit 260, L1 Cache 204, FPU 206, and BC 208—C-Bus control is in the BC 208. The C-Bus includes a 32 bit address Bus C_ADDR, two 32-bit data Buses C_DATA and C_DDATA, and a 128-bit (16 byte cache line) dedicated instruction Bus. C_DATA and C_DDATA can be controlled to provide for 64 bit transfers to the FPU 206, and to support interfacing the L1 Cache 204 to a 64-bit external data Bus. In general, for 32-bit data transfers, the $C_{13}$ DATA bus is used for loads coming from off-chip through the BC 208 to the LDST unit 260, the L1 Cache 204, and/or the PFU 240, and the C_DDATA Bus is used for stores into the L1 Cache 204 or external memory through the BC 208. For instruction fetch misses, instruction data is provided over the C_DATA Bus to the PFU 240 at the same time it is provided to the L1 Cache 204.

The X-Bus is an extension of the external Bus interface that allows peripheral devices to be integrated on chip.

2. Clock Generation And Distribution

The clock generator 270 generates a plurality of independently adjustable internal clock signals for use throughout Processor 200. Specifically, internal clock signals BCLK and BCLKC are forwarded to the BC 208 and clock signal GCLK is forwarded to CPU core 202.

Referring to FIG. 2a, the generalized placement and control of clock generator 270 is described within processor 200 and relative to certain external functions in a typical computer system. Clock generator 270 receives an external clock signal from clock source 604 (FIG. 1) from which it generates clock signals to BC 208 and to the CPU core 202. BC 208 is coupled to the P-Bus which in turn communicates with external units such as, but not limited to, system chipset 601 and datapath chipset 602 (FIG. 1). Clock generator 270 receives control inputs from several functional units within processor 200.

Clock generator 270 is operable to vary the frequency of the clock signals presented to CPU core 202 and to BC 208 responsive to certain indicia of critical activity within the processor 200. Specifically detection of low level activity on the external P-Bus causes a reduction in clock frequency, both as presented to the BC 208 and also to CPU core 202. Clock frequency is also reduced under software control through flags in control I/O registers, described in more detail hereinbelow.

An internal heuristic is utilized to reduce clock frequency upon detection that CPU core 202 is repeatedly executing the same program loop (i.e. is not performing critical work). Likewise, these control events are also used to speed the clock rate back up in certain events, such as if the program loop is exited, if bus traffic again begins, or under software control In addition to control of the frequency of the internal clock signals, clock generator 270 may also serve to stop the clocks to the CPU core 202 or BC 208 altogether in certain events.

Regarding the internal heuristic, program activity detection circuitry in the Pipe Control Unit 222 portion of the CPU core 202, presents control inputs to clock generator 270. The control inputs generated by program activity detection circuitry are based upon loop activity of processor 200. If CPU core 202 has repeatedly executed the same program loop several times in succession, clock generator 270 reduces the frequency of the clock signals presented to CPU core 202, thus reducing the power dissipation.

Clock generator 270 also receives an activity detection signal from BC 208. Bus activity as detected by BC 208 causes clock generator 270 to increase the frequency of the bus clock and possibly the core clock, if bus activity, such as memory reads and writes, are to take place. Clock generator 270 also receives a control input from the control I/O registers indicating that the internal clock frequency of processor 200 is to be reduced or increased—determinable by program control.

Figure 3:
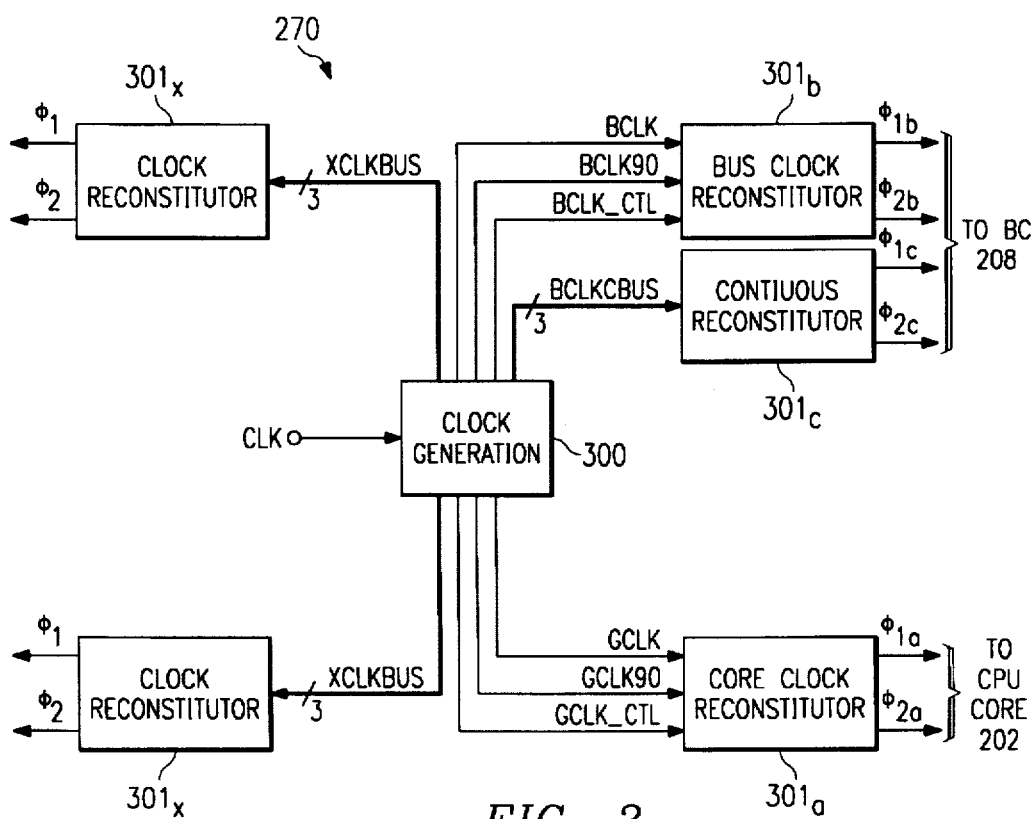
FIG. 3 is a block diagram of clock generation circuitry practiced in accordance with the principles of the present invention.

Reference is now made to FIG. 3 which depicts a block diagram of the clock generator 270. Clock generation circuitry 300 is coupled to receive an external clock signal or an initiating clock signal edge (described in more detail hereinbelow) on terminal CLK. Clock generation circuitry 300 then generates multiple signals on a plurality of buses (preferably a three-wire bus) that are forwarded to a plurality of clock reconstitutors $301_a$–$301_x$. The signals presented on the bus include two clock signal phases that are substantially 90 degrees out of phase with one another, and a control signal line.

Clock reconstitutors $301_a$–$301_x$ are preferably located near those functional units within processor 200 that are to receive the clocks upon which their operation is based. For example, core clock reconstitutor $301_a$ receives signals from clock generation circuitry 300 on lines GCLK, GCLK90, and GCLK_CTL and based on these signals, produces clock phases $\phi_{1a}$ and $\phi_{2a}$ for application to CPU core 202 on which the execution of the pipelined instructions described hereinabove are based. Similarly, bus clock reconstitutor $301_b$ receives lines BCLK, BCLK90, and BCLK_CTL from clock generation circuitry 300 from which bus clock phases $\phi_{1b}$ and $\phi_{2b}$ are produced and applied to BC 208. Core clock phases $\phi_{1a}$ and $\phi_{2a}$ and Bus clock phases $\phi_{1b}$ and $\phi_{2b}$, may each have their frequency adjusted independently according to the criticality of the operations being performed by processor 200 under hardware or software control, as described above.

It is preferable however, to have at least some clock signals that are not adjusted (i.e. maintain a constant frequency), particularly relative to external bus control. Accordingly, continuous bus clock reconstitutor $301_c$ receives clock control lines BCLKC, BCLKC90, and BCLKC_CTL (collectively referred to as the BCLKCBUS) from clock generator 300 and generates continuous bus clock phases $\phi_{1c}$ and $\phi_{2c}$ which are applied to BC 208. Continuous bus clock phases $\phi_{1c}$ and $\phi_{2c}$ are not adjusted in frequency so that BC 208 receives and responds to bus traffic on the P-Bus at the fastest or optimal speed.

Clock generator 270 may include other clock reconstitutors $301_x$ for additional functional units. Each of these reconstitutors $301_x$ similarly receive clock and control signals on a three line Bus (depicted as XCLKBUS in FIG. 3), based upon which phases $\phi_{1x}$ and $\phi_{2x}$ are generated and applied to the appropriate functional unit in processor 200. It is contemplated that these additional reconstitutors $301_x$ may receive the bus clock signals BCLK, BCLK90, and BCLK_CTL, the core clock signals GCLK, GCLK90, and GCLK_CTL, or some other type of clock and control signals, depending upon the functionality of the unit served in that locality. In any event, it is contemplated that all of reconstitutors $301_a$–$301_x$ in clock generator 270 will be similarly constructed, in the manner described hereinbelow.

2.1 Selectable Clock Generation Mode

Figure 4:
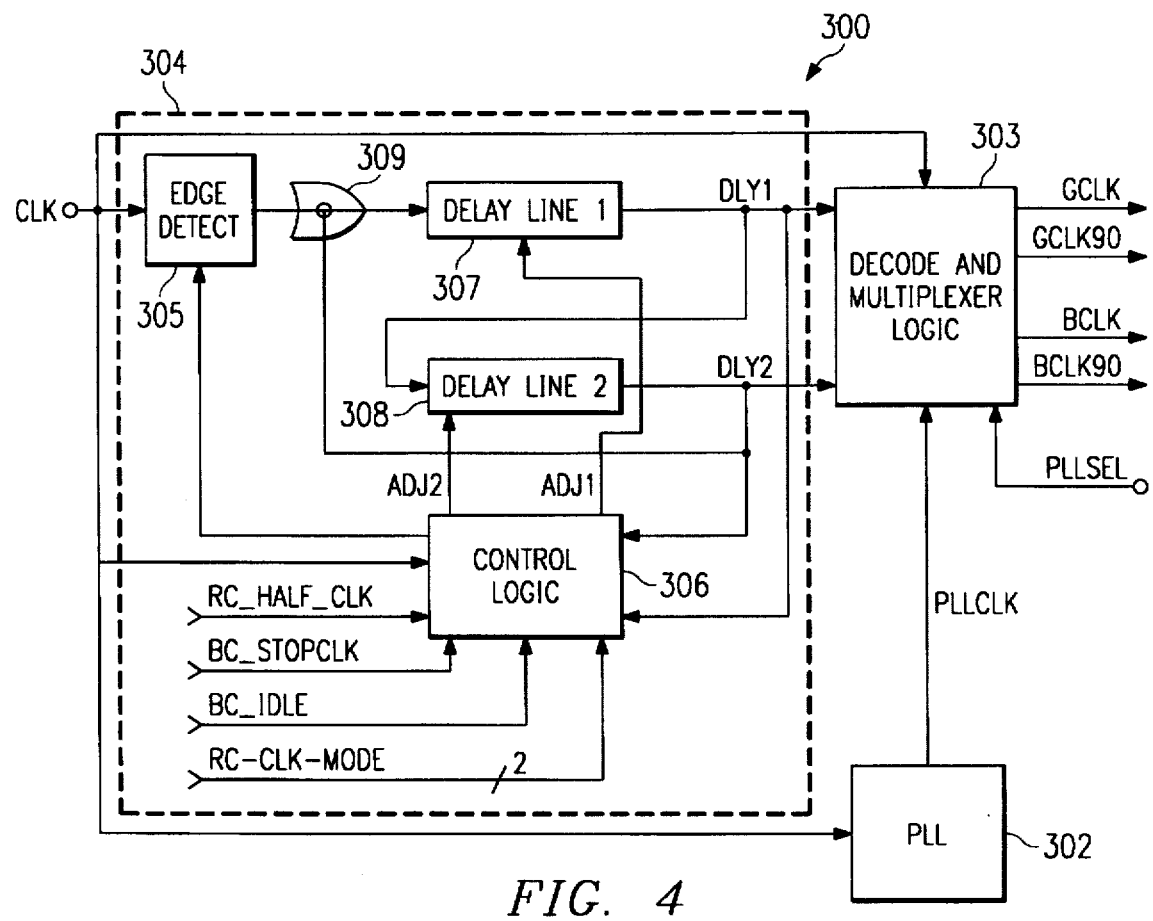
FIG. 4 block diagram of static clock circuitry according to the preferred embodiment of the invention.

Reference is now made to FIG. 4 which depicts the clock generation circuitry 300 of FIG. 3 in more detail. Clock generation circuitry 300 preferably includes a conventional phase-locked loop (PLL) 302 for generating internal clock signals based upon an external clock signal applied to terminal CLK. Those skilled in the art will recognize many forms for the PLL 302 without departing from the scope or spirit of the present invention. An exemplary, but not exclusive, PLL 302 for use with the present invention is described in U.S. Pat. No. 5,233,314 entitled "Integrated Charge Pump Phase-Locked Loop Circuit", issued Aug. 03, 1993, assigned to the Assignee of the present invention and herein incorporated by reference.

The output of PLL 302 is applied to decode and multiplexer logic circuitry 303. Clock generation circuitry 300 also includes a static clock generator 304, described in further detail hereinbelow, which generates clock signals based upon an initiating clock signal edge, or a periodic signal, applied to external clock terminal CLK. The output of static clock generator 304 is also applied to decode and multiplexer logic circuitry 303. Accordingly, either the static clock generator 304 or the PLL 302 is selected to generate the internal clocks GCLK, BCLK, etc. in processor 200 by a control signal on line PLLSEL to decode and multiplexer logic circuitry 303.

Line PLLSEL may be coupled to an "in-lock" signal generated by the PLL 302 to indicate that the PLL 302 is within-lock range and can be used to generate clock signals. That is, decode and multiplexer logic circuitry 303 is controlled by the in-lock signal such that it steers the out-put from the static clock generator 304 to generate the internal clocks until the PLL 302 obtains lock. When the PLL 302 obtains lock, the in-lock signal is asserted thus the PLLSEL is asserted—forcing the decode and multiplexer logic circuitry 303 to steer the PLL 302 to generate the internal clocks.

Alternatively, the PLLSEL line may be internally hardwired with a bond wire to either a logic high or low value to permanently select the PLL 302 or the static clock generator 304 as the source for clock generation. Yet another alternative to controlling the PLLSEL line is to bond-out it out to an externally accessible pin so that the user may select the clock generation mode. Yet even another alternative for controlling the PLLSEL line is to couple it to a control point in boundary scan test logic, such as defined by the JTAG interface (IEEE Std. 1149.1). Exemplary but not exclusive boundary scan test logic can be found in U.S. Pat. No. 5,428,622 entitled "Testing Architecture With Independent Scan Paths", issued Jun., 27, 1995, assigned to the Assignee of the present invention and herein incorporated by reference.

The PLLSEL line may also preferably, although not necessarily, be coupled to enable lines on the PLL 302 and the static clock generator 304 to selectively disable the non-selected circuitry in order to conserve power consumption.

2.2 Static Clock Generation

Static clock generator 304 includes an edge detector 305 coupled to the external clock terminal CLK to receive either an external clock signal or an initiating clock signal edge. Edge detector 305 is a conventional edge or transition detector circuit (e.g. a D-type flip-flop that is clocked by terminal CLK and reset by control logic circuitry 306) that generates a pulse responsive to, in this case, a high-to-low clock transition edge at terminal CLK. The output of edge detector 305 is applied via logical OR gate 309 to the input of a first delay line 307. Delay line 307 is constructed in conventional fashion as a variable delay line with the duration of the propagation delay controlled by control logic circuitry 306 via line ADJ1.

The output of first delay line 307 is presented on line DLY1 to decode and multiplexer logic circuitry 303, to control logic circuitry 306, and also to the input of a second delay line 308. Second delay line 308 is similarly constructed as first delay line 307 and as such is a variable delay line with its propagation delay under the control of control logic circuitry 306 via line ADJ2. The output of second delay line 308 is presented on line DLY2, to decode and multiplexer logic circuitry 303, to control logic circuitry 306, and to logical OR gate 309 for application to the input of first delay line 307. Clock terminal clk is also coupled to decode and multiplexer logic circuitry 303 and to control logic circuitry 306.

Figure 5:
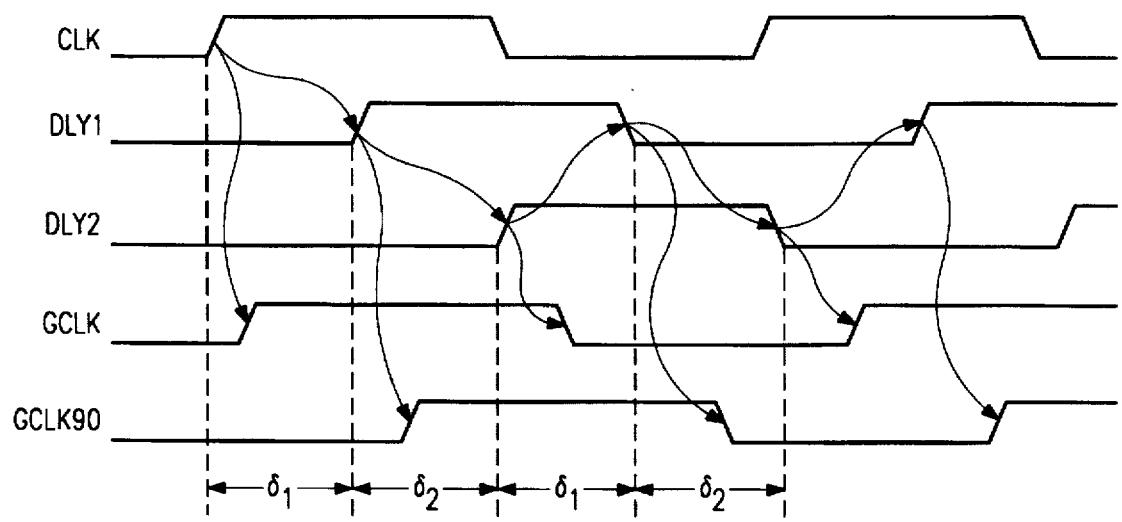
FIG. 5 is a timing diagram of clock signals generated in accordance with the principles of the present invention.

Reference is now made to FIG. 5 which depicts a timing diagram of clock signals generated in accordance with the principles of the present invention. Static clock generator 304 generates clock signals on lines DLY1 and DLY2 responsive to the receipt of a single edge or a periodic signal at terminal CLK. The clock signal at terminal CLK initiates the generation of signals on line DLY1 with a rising edge following the rising edge on line CLK—delayed a time $\delta_1$. The time $\delta_1$ is the propagation delay through first delay line 307. A rising edge on line DLY2 follows the rising edge on line DLY1—delayed a time $\delta_2$. The time $\delta_2$ is the propagation delay through second delay line 308. Following the rising edge on line DLY2 (see logical OR gate 309 in FIG. 4), a falling edge then appears on line DLY1 after the expiration of delay time $\delta_1$. A falling edge then occurs on line DLY2 at time $\delta_2$ after the falling edge on line DLY1. The falling edge on line DLY2 will then generate the next rising edge on line DLY1 via logical OR gate 309 after the delay time $\delta_1$.

Static clock generator 304 performs clock frequency multiplication and division, in a way that allows for clocks to be stopped or adjusted at any time in the operation of processor 200. Control logic circuitry 306 provides the functions of determining clock multiples necessary to generate the various frequency multiplication (e.g. internal clock signals GCLK, GCLK90 relative to the clock signal on terminal CLK), and adjusts the duty cycle accordingly.

Figure 6:
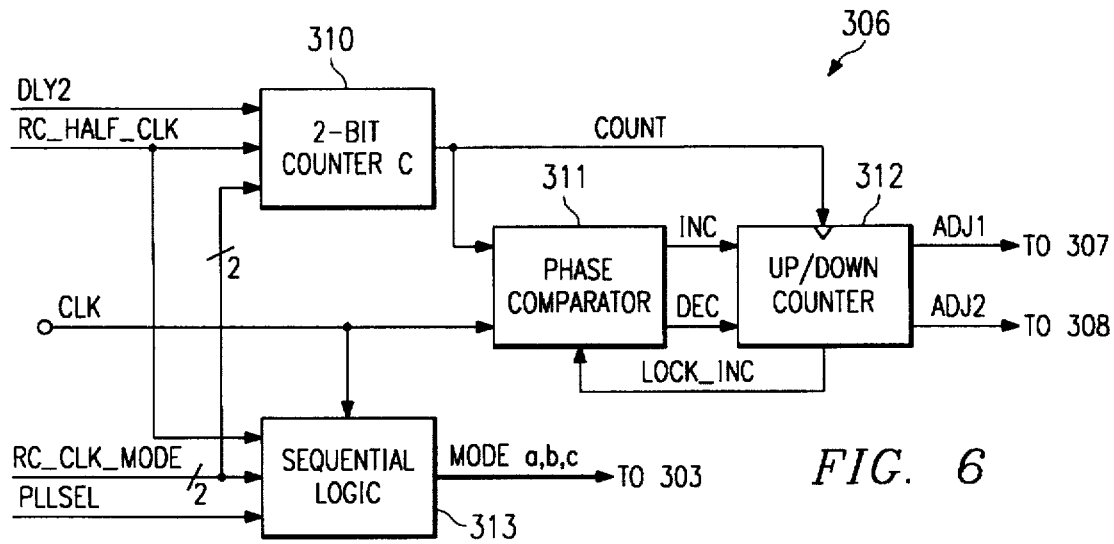
FIG. 6 is a block diagram of the control logic in the static clock circuitry of FIG. 4.

Reference is now made to FIG. 6 which depicts a block diagram of the control logic circuitry 306 of FIG. 4 in more detail. Control logic circuitry 306 includes a counter 310 that receives an input signal from line DLY2 and control signals on lines RC_HALF_CLK and RC_CLK_MODE. Counter 310, which in this example is a selectable two-bit counter, generates a rising edge on its carry output (C) that drives line COUNT. Control line RC_HALF_CLK (when enabled by line RC_CLOCK_MODE indicating that static clock generator 304 is to be enabled, in lieu of PLL 302) controls counter 310 to count two clock edges prior to issuing the carry signal on line COUNT. Alternatively, if $RC_{13}$ HALF_CLK is not asserted, one stage of counter 310 is removed so that line COUNT will follow each edge of line DLY2. Accordingly, the number of rising edges required to produce the carry and thus the number of pulses on lines DLY1 and DLY2 per external clock cycle, are determined by the control signal on line RC_CLK_MODE. For example, if a 40 clock mode is desired, two rising edges of each of lines DLY1 and DLY2 may be required per external clock cycle. Line RC_CLK_MODE is then asserted to cause counter 310 to have a carry out after the second rising edge of line DLY2. It should be understood that counter 310 may have more than two bits selectable by additional control signals, if additional pulses of lines DLY1 and DLY2 are required in each external clock cycle without departing from the scope of the present invention.

Line COUNT is coupled to an input of phase comparator 311 and also to the clock input of up/down counter 312. Phase comparator 311 determines whether line COUNT, which indicates completion of the desired count of pulses on line DLY2, leads or lags the rising edge of the next external clock at terminal CLK. Phase comparator 311 has increment (INC) and decrement (DEC) outputs which control the direction of up/down counter 312. Up/down counter 312 stores a value corresponding to the propagation delay of delay lines 307 and 308. If the signal on COUNT leads the signal on CLK (meaning that the desired number of edges of DLY2 have occurred prior to receipt of the next external clock signal), phase comparator 311 asserts its output line INC and de-asserts its output line DEC causing up/down counter 312 to increment upon receiving the next rising edge on line COUNT. Conversely, if the signal on CLK leads the signal on COUNT, phase comparator 311 asserts line DEC and de-asserts line INC so that the delay through delay lines 307 and 308 is incrementally reduced upon the next rising edge on line COUNT.

It is preferable that control logic circuitry 306 allow the delays through delay lines 307 and 308 to "ratchet" down to the highest frequency clock signal applied to terminal CLK. As such, upon "locking" of phase comparator 311 and up/down counter 312 to the frequency at terminal CLK, up/down counter 312 is operable to assert line LOCK_INC, forcing line INC at the output of phase comparator 311 to a logic low level so that up/down counter 312 is no longer incremented. In this manner, up/down counter 312 remains operable to decrement its contents, and thus reduces the propagation delay through delay lines 307 and 308, upon receipt of higher frequency external clock signals. Once locked however, static clock generator 304 will remain generating clock signals at the highest frequency external clock rate even if the external clock at terminal CLK is no longer applied.

Control logic circuitry 306 includes sequential logic circuitry 313 for controlling decode and multiplexer logic circuitry 303 to generate the clock signals BCLK, GCLK and derivatives according to the selected mode a, b, and c. In particular, according to the present invention, it is desirable that clock generation circuitry 300 be able to rapidly switch clock frequency modes "on the fly", such as in the event that non-essential activity is being performed by CPU core 202, as will be described hereinbelow, without incurring delays due to mode switching and in such a manner that does not cause operational instability as may result if overlapping clock phases are generated. Sequential logic circuitry 313 receives a multiple-bit signal on line RC_CLK_MODE, selecting one of several available clock modes (e.g. 1×, 2×, 3×, 4×). Sequential logic circuitry 313 also receives control signals RC_HALF_CLK and PLLSEL and a clock signal from terminal CLK which latches the states on lines RC_CLK_MODE and RC_HALF_CLK on a rising edge. In this manner, changing of clock modes may take place from cycle to cycle. The output of sequential logic circuitry 313 is provided on multiple control lines (MODE a, b, c) that are applied to decode and multiplexer logic circuitry 303 to generate the actual clock edges, as will now be described.

Figure 7:
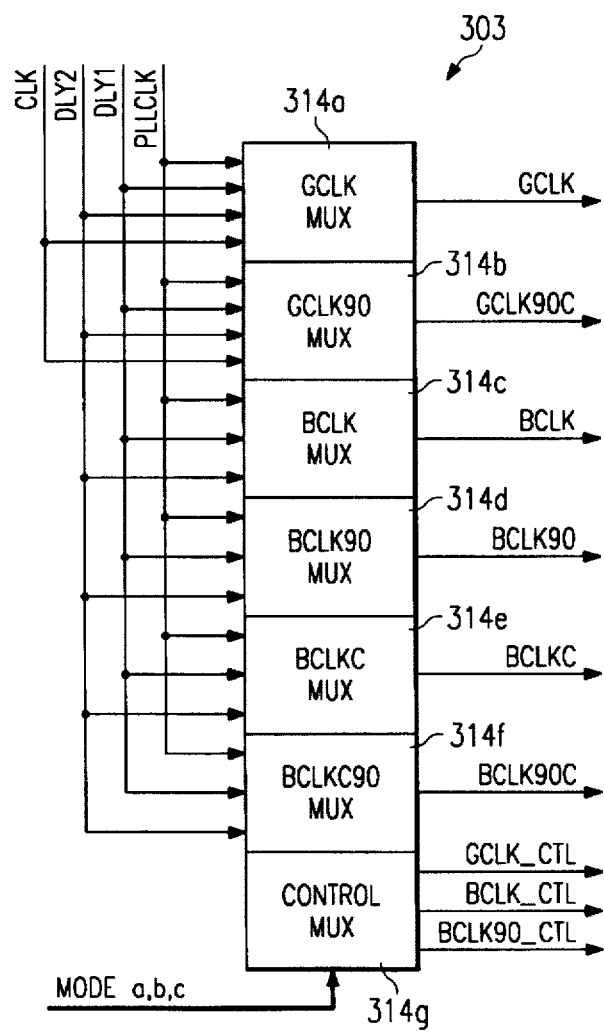
FIG. 7 is a block diagram of decode and multiplexer logic circuitry in the clock generator circuitry of FIG. 4.

Reference is now made to FIG. 7 which depicts a block diagram of the decode and multiplexer logic circuitry 303. Decode and multiplexer logic circuitry 303 includes several individual multiplexers ($314_a$–$314_g$) by way of which each of the clock signals BCLK, BCLK90, GCLK, GCLK90, BCLKC, BCLK90C are generated, along with the control lines for each. Inputs to multiplexers $314_a$–$314_f$ include lines DLY1 and DLY2 generated by delay lines 307 and 308, PLLCLK (from PLL 302), and MODE a, b, c. Multiplexers $314_a$ and $314_b$ further include an input from the external terminal CLK.

Figure 8:
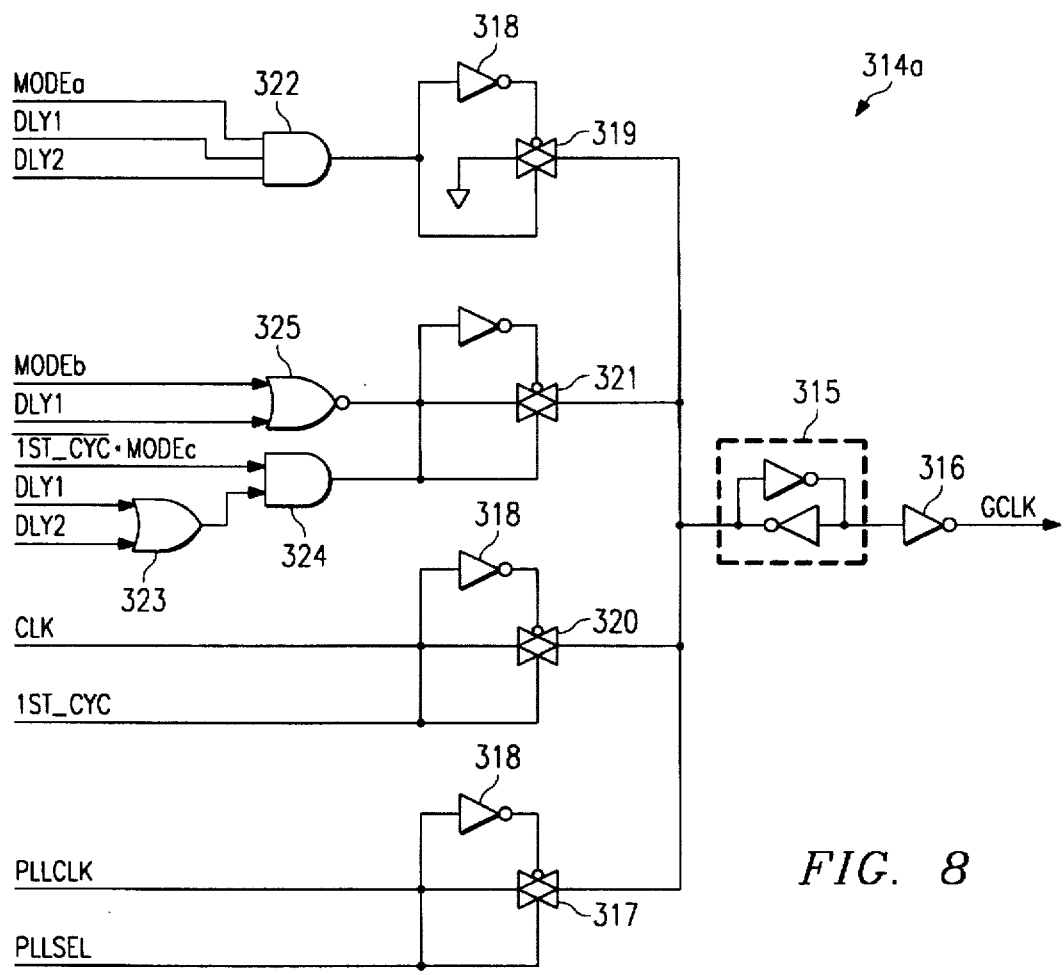
FIG. 8 is a diagram of a multiplexer in the decode and multiplexer logic circuitry of FIG. 7.

Reference is now made to FIG. 8 which depicts one of multiplexers 314, specifically multiplexer $314_a$. It should of course be noted that the other multiplexers $314_{b-g}$ may well have other logical combinations used in generating their respective clock outputs, and indeed other combinations may be used to generate clock signal GCLK, as may be readily implemented by one of ordinary skill in the art. Several different combinations may be used to generate various phases of clock signal GCLK, all of which are logically wired-ORed at the input to latch 315. For example, pass gate 317 is controlled by line PLLSEL so that when line PLLSEL is asserted high, pass gate 317 is conductive and the output of PLL 302 on line PLLCLK is applied to the input of latch 315 to drive clock GCLK.

The MODE control signals from sequential logic circuitry 313 are used to control the signals applied to pass gates 319 and 321. Pass gate 320 is controlled so that upon the first cycle (indicated by line 1ST_CYC being asserted), the external clock signal CLK is passed through to latch 315. Pass gate 319 is controlled by the output of logical AND gate 322 which receives input signals from $MODE_a$ and lines DLY1 and DLY2. Pass gate 321 is controlled by the logical combination of DLY1, DLY2, mode signal $MODE_c$, and the compliment of 1ST_CYC via OR gate 323 and AND gate 324.

FIG. 5 illustrates a simple case in which clock signals GCLK and GCLK90 are generated from lines DLY1 and DLY2 for generation of internal clocks at the same frequency as the external clock (i.e. 1× clock mode). According to this embodiment of the invention, as discussed above, it is important that the initial clock edge of internal core clock signal GCLK not be substantially delayed from the external clock signal at terminal CLK, considering that other components in the computer system (memory, I/O devices, etc.) are also being controlled by this external clock signal, and would suffer if clock signal GCLK were substantially skewed. Accordingly, decode and multiplexer logic circuitry 303 directly applies the clock signal CLK to line GCLK upon its receipt, for example via pass gate 320 of FIG. 8. Following this first edge, line GCLK returns low upon line DLY2 going high (e.g. via AND gate 322 and pass gate 319 of FIG. 8). Line GCLK then returns high responsive to the next falling edge of line DLY2, and the process continues. As such, clock signal GCLK, in this mode, follows line DLY2. Clock signal GCLK90, on the other hand goes high responsive to line DLY1 going high, and returns low responsive to line DLY1 returning. As will be described in further detail hereinbelow, it is important, from the standpoint of clock generation by reconstitutors 301, that the three clock signals for each clock group be "gray-coded", i.e., do not have any coincident edges among the three clocks.

In each case, it is preferred that the control signals generated by sequential logic circuitry 313 on lines MODE a, b, c are non-overlapping in time. For the example of FIG. 8, the assertion of lines $MODE_a$ and $MODE_c$ should not overlap in time, so that only one of pass gates 317, 319, 320, and 321 is on at any one time. This control is essential in order to avoid the imposition of inconsistent logic levels at the wired-OR node at the input to latch 315. Of course, other logical combinations may be used to produce clock signals such as GCLK responsive to sequential logic circuitry 313 and delay lines 307 and 308. It is contemplated that, with the aid of the present disclosure, such additional combinations are within the ordinary skill in the art. In this more general sense, the combination of control logic circuitry 306 and decode and multiplexer logic circuitry 303 may be considered as a state machine used to generate the various clocks at the desired clock modes (½×, 1×, 2×, 3×, 4×).

Figure 9:
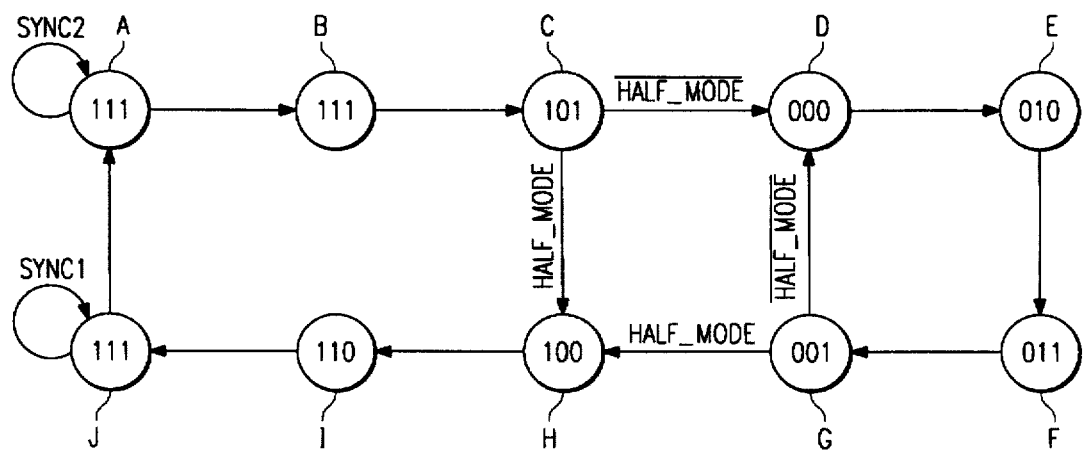
FIG. 9 is a state diagram illustrating the operation of the static clock generator circuitry of FIG. 4.

Reference is now made to FIG. 9 which depicts a state diagram for the generation of one set of clocks (e.g. core clocks GCLK, GCLK90, and GCLK_CTL). The state diagram consists of ten states namely: A through J. The three-bit indication depicted within each state indicates the logic level of clock signals GCLK, GCLK90, and GCLK_CTL, respectively. For example, state C has an indication of 101, which means that clock signals GCLK, GCLK90, and GCLK_CTL are logically high, low, and high, respectively, in that state. Change of state will occur four times per fundamental clock cycle, preferably under the control of the PLL 302 (even where not used in generating the internal clock). The control signal HALF_MODE (or its complement) controls selection between output clock signal frequencies. Slower frequency operation is obtained by reducing duty cycle, rather than lengthening both the asserted and non-asserted pulse widths of the clock signals.

In other words, the active pulse widths of the eventual phases presented by reconstitutors 301 will be identical among the various frequency modes. This ensures that there will be no overlapping clock pulses communicated throughout processor 200, except for one point per slowest cycle in which pulses are the identical pulse width. In this manner, particularly since different portions (e.g. CPU core 202 and BC 208) of processor 200 may be operating at different frequencies, synchronization is maintained. Furthermore, power is saved by maintaining the active pulse width identical among frequency modes, considering that precharge operations occur only during active clock pulses. Since precharge is fully complete for the shortest specified active pulse width, the shortest pulse width may be used for all frequencies, even the slowest. Since the power consumed is the integral of the active pulses over time, significant power is thereby saved in lower frequency operation by reducing the active clock pulse duty cycle.

Figure 10A:
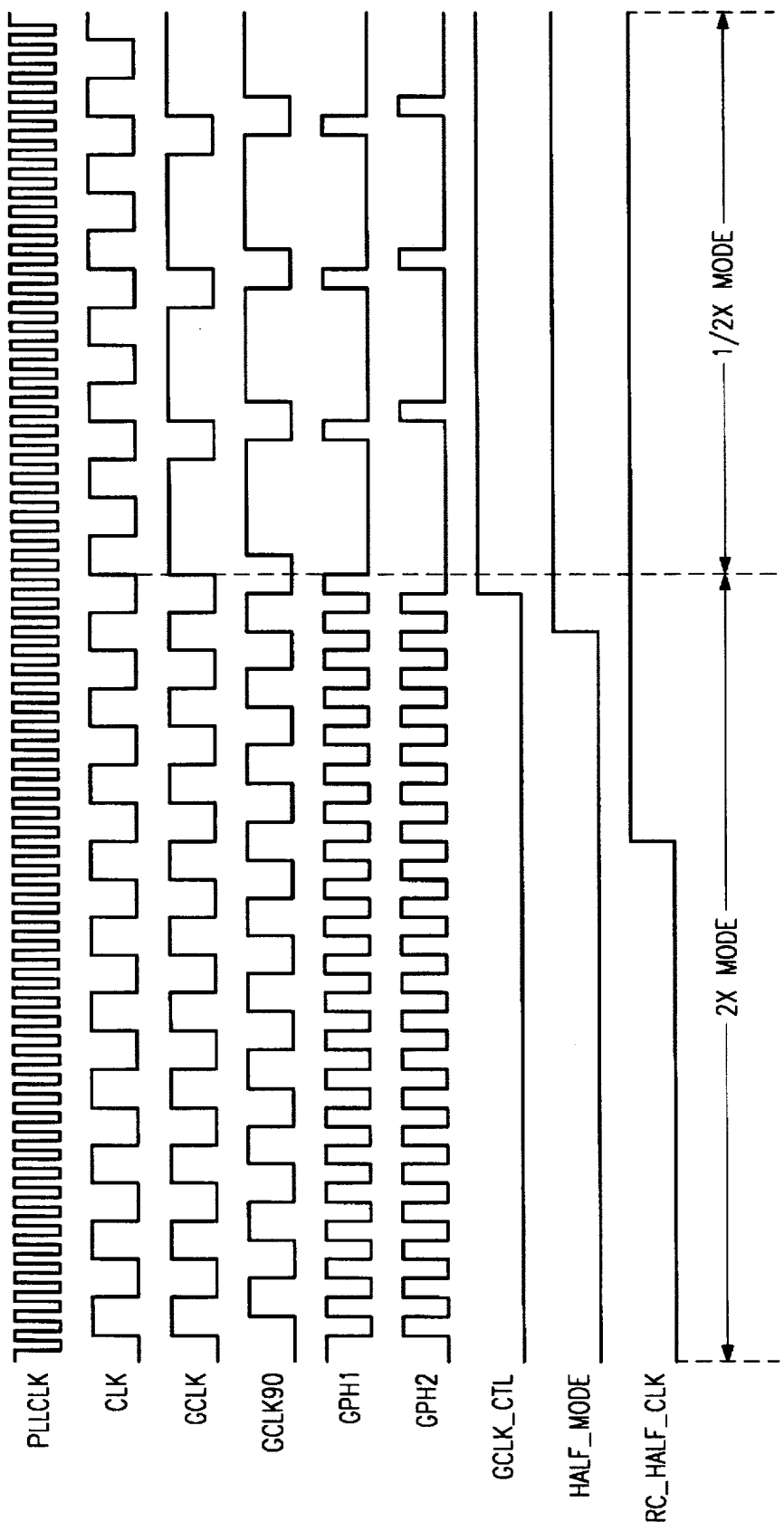
FIGS. 10a–10c are timing diagrams illustrating examples of the operation of the static clock generator circuit in FIG. 4.

Reference is now made to FIG. 10a which depicts a timing diagram of an exemplary operation of the state machine represented in FIG. 9. More specifically, the timing diagram illustrates a mode in which the frequency of the GPH1 and GPH2 signals generated by a reconstitutor 301 is twice the frequency of CLK at terminal CLK and then changes to ½×. In the first portion of the timing diagram of FIG. 10a, signals GPH1 and GPH2 are generated in 2× mode, (i.e. at twice the frequency of CLK). As depicted in FIG. 10a, line GCLK_CTL is low at during this operation and clocks GCLK and GCLK90 are toggling at the frequency of CLK, but 90 degrees out of phase from one another. In this mode, the states of FIG. 9 change from state D to state E to state F to state G, indicating that line GCLK_CTL stays low, and that the signal HALF_MODE is not asserted at state G, such that control passes from state G to state E within each cycle.

The ½× frequency mode is enabled by line RC_HALF_CLK being driven high, which subsequently results in line HALF_MODE being asserted. Responsive to line HALF_MODE being asserted, upon the next time thereafter that state G is reached, control will pass to state H rather than to state E (as occurred in 2× mode). Accordingly, eight state transitions are performed per cycle in ½× mode as follows:

H–I–J–J–A–A–B–C (then repeat)

The two ¼ cycles spent at states J and A occur in order that the full cycle in ½× mode takes eight ¼ cycles of the fundamental clock cycle. It should also be noted that states J and A are used as wait states, if resynchronization between core clocks GLCLKX and Bus clocks BCLKX is necessary. As evident from the above state transitions, and from FIG. 10a, the ½× frequency mode is obtained by maintaining both of GCLK and GCLK90 at high logic levels for six states in the eight state sequence. The phases generated by reconstitutors 301 (described hereinbelow) are thus at ½ the frequency of CLK, but maintain the minimum active pulse width at the same rate as in the 2× mode, thus avoiding problems of overlapping clocks as mentioned above.

Figure 10B:
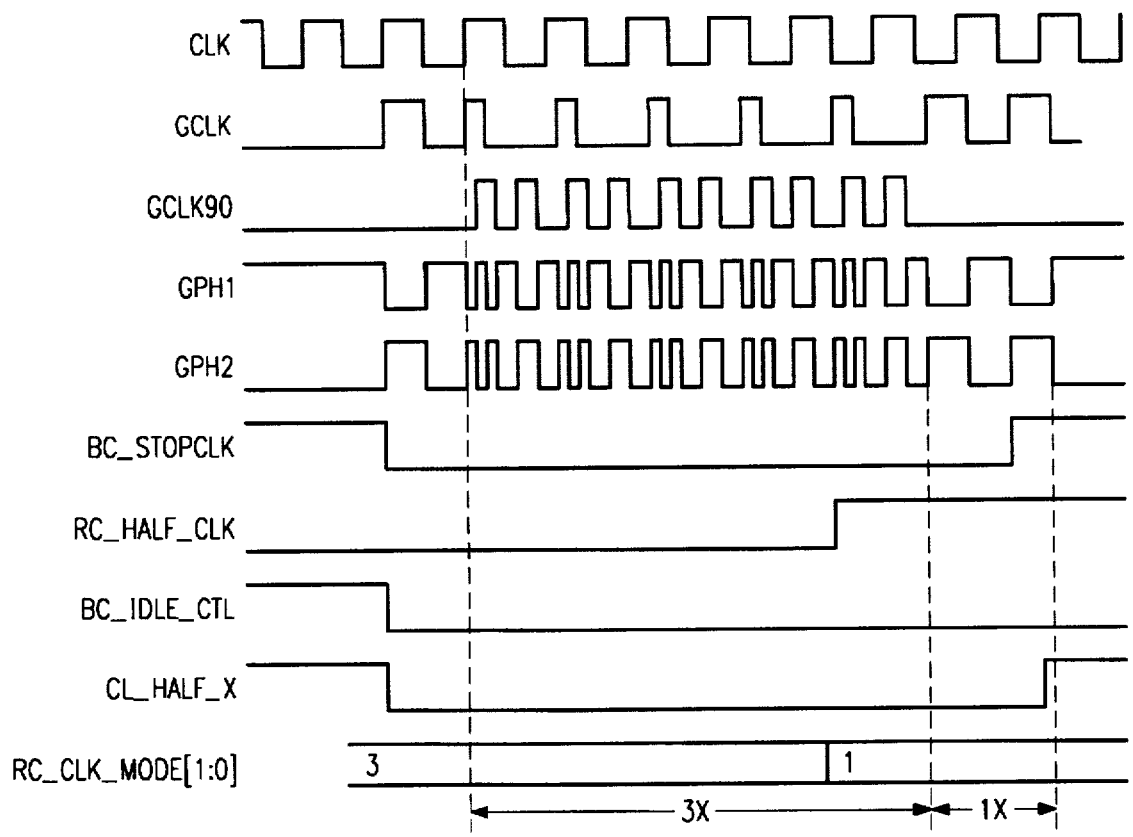

Other clock modes are also available from the operation of control logic circuitry 306 and decode and multiplexer logic circuitry 303. FIG. 10b illustrates two such modes, namely 3× and 1× modes with a transition therebetween. The 3× mode is initiated by lines RC_CLK_MODE bearing a binary value of three. In this mode (once RC_HALF_IDLE is de-asserted, thus enabling clocks to be generated), one active pulse of clock GCLK and two active pulses of clock GCLK90 are generated by static clock generator 304 described hereinabove.

Referring to the state diagram of FIG. 9, the eight state transitions in this mode are as follows:

D–E–F–G–D–D–G–G which are then repeated as long as 3× mode is desired. Of course, additional control inputs are used to effect these state transitions (other than line HALF_MODE depicted in FIG. 9). Transition from 3× mode to 1× mode is accomplished by enabling line RC_HAL_CLK responsive to which with lines RC_CLK_MODE still at binary three, only clock GCLK is generated with clock GCLK90 remaining low. The eight state transitions for this mode are thus as follows:

E–E–E–E–D–D–D–D which are then repeated as desired. As depicted in FIG. 10b, the clock phases GPH1, GPH2 are generated as logical complements of one another in each of these modes.

Figure 10C:
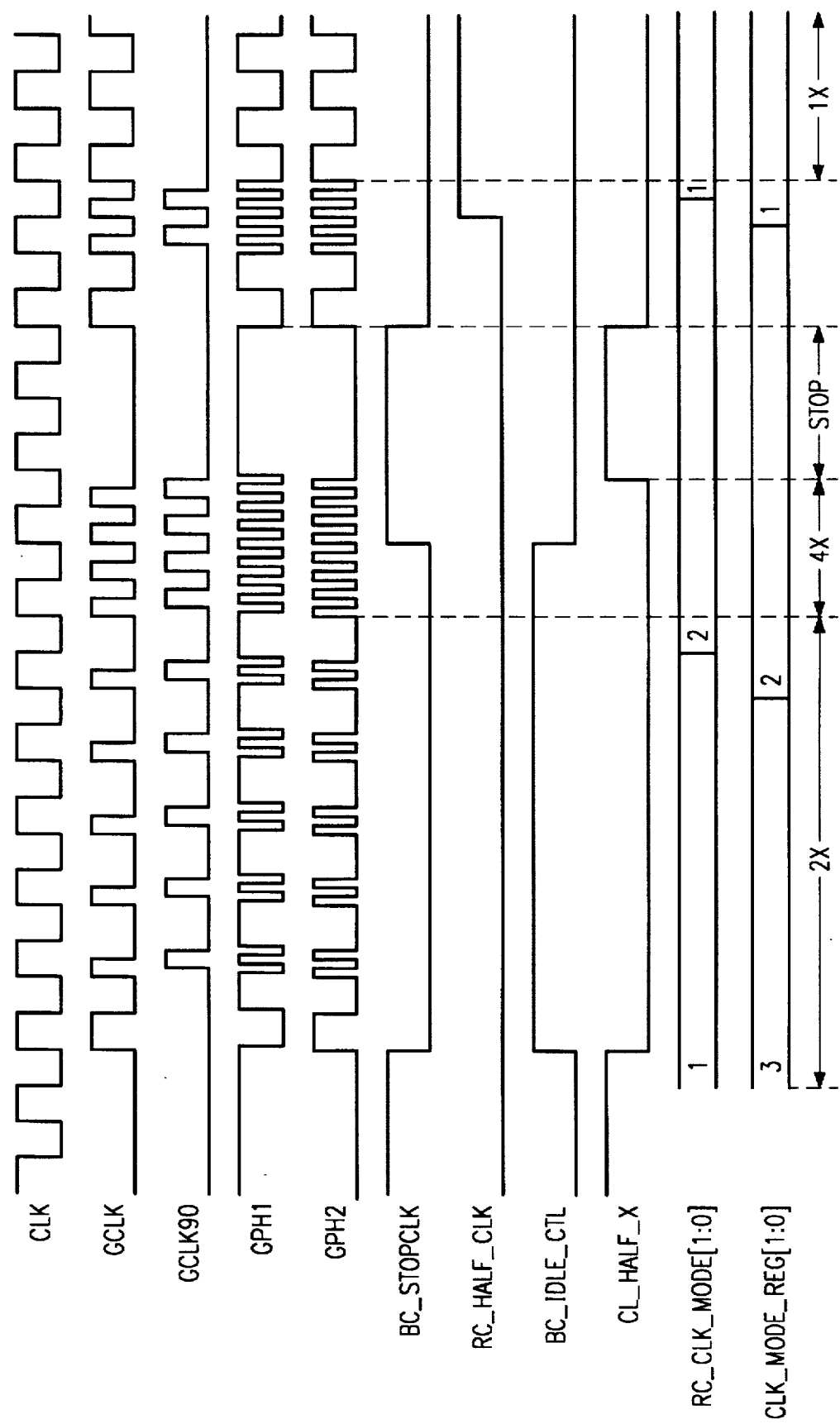

Reference is now made to FIG. 10c which depicts transitions from a 2×mode, to a 4× mode, to a stopped mode, to a 133 mode. The 2× mode is intiated and operates in the manner described hereinabove. Responsive to lines RC_CLK_MODE receiving the value of binary two, the 4× mode is enabled so that two pulses of GCLK and GCLK90 are produced per cycle (i.e. the state transitions of FIG. 9 are produced eight times per cycle while maintaining the sequence for 2× mode). Line BC_STOPCLK is then asserted which halts the operation of decode and multiplexer logic circuitry 303 from producing clocks GCLK, GCLK90, and GCLK_CTL. Other clocks are also halted at this time except for the continuous bus clocks BCLKC, BCLK90C, and BCLKC_CTL which are maintained to respond to bus traffic on the P-Bus. Once line BC_STOPCLK is removed, and after one synchronization cycle, operation returns to 1× mode (since RC_CLK_MODE is bearing the value binary one).

Accordingly, it should be understood from the foregoing description that static clock generator 304 and clock generation circuitry 300 are able to produce clock signals for CPU core 202 and BC 208 of processor 200 at various frequencies, based upon which the particular phases of clocks may be locally generated as will be described hereinbelow. The frequency mode of the clocks may be adjusted from cycle to cycle, and the clock signals may be statically generated by static clock generator 304 even in the absence of an external clock signal. Furthermore, static clock generator 304 according to this embodiment of the invention is able to set its frequency to the fastest external clock signal presented to it, maintaining timing compatibility of processor 200 relative to the other components in the system. Skew is also avoided by clock generator circuitry 300 in its presentation of the first external clock edge as the core clock signal, followed by edges generated via the delay stages in static clock generator 304.

3. Reconstitutors

Figure 11:
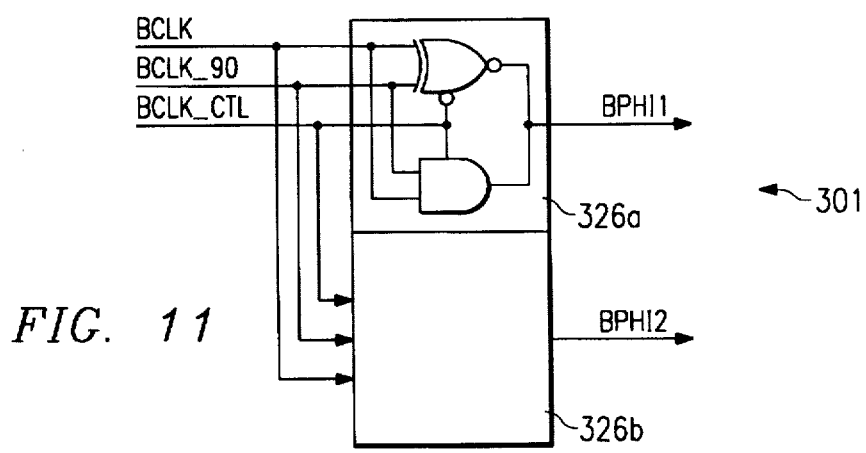
FIG. 11 is a more detailed diagram for one of the reconstitutors depicted in FIG. 3.

Reference is now made to FIG. 11 which depicts one of the reconstitutors 301$_b$, practiced in accordance with principles of the present invention. The exemplary reconstitutor 301$_b$ generates signals BPHI1 and BPHI2 based on clock signals BCLK, BCLK90, and BCLK_CTL. Reconstitutor 301$_b$ consists of two reconfigurable logic gates 326$_a$ and 326$_b$ wherein reconfigurable logic gate 326$_a$ generates the BPHI1 signal and reconfigurable logic gate 326$_b$ generates the BPHI2 signal. In this example, reconfigurable logic gate 326$_a$, includes an exclusive OR function and a NAND function, selectable responsive to line BCLK_CTL. Clock signal BPHI1 corresponds to the XNOR of BCLK and BCLK90 when line BCLK_CTL is low and to the logical NAND of BCLK and BLCK90 when line BCLK_CTL is high.

Referring again to FIGS. 10a–10c, core clock phases GPHI1 and GPHI2 are similarly generated by reconstitutor $301_a$. In these examples, GPHI1 is the logical XNOR of GCLK and GCLK90 when line GCLK_CTL is low and is the logical NAND of GCLK and CCLK90 when line GCLK_CTL is low. GPHI2 is the logical XNOR of GCLK and GCLK90 when line GCLK_CTL is low and corresponds to the logical XNOR of GCLK and the complement of GCLK90 when line GCLK_CTL is high.

3.1 Distributed Clock

Figure 17:
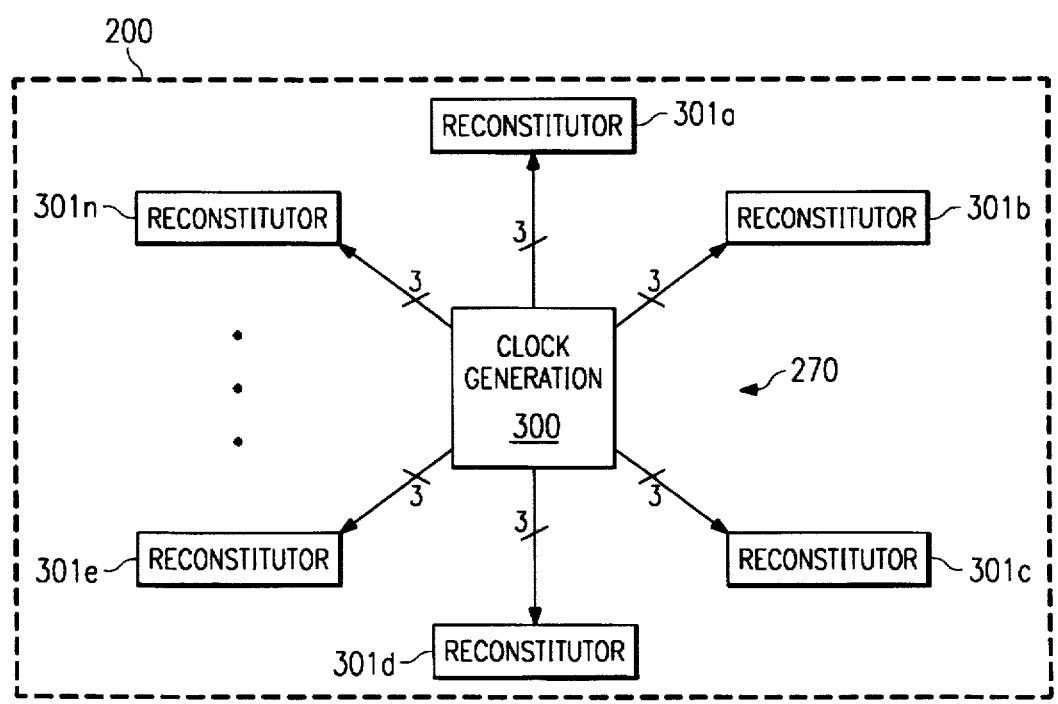

The distributed nature of clock generator 270 according to the embodiment of the invention is best illustrated in FIG. 17. Reconstitutors 301a–301n are physically disposed within the processor 200 near the functional unit they service to allow for local generation of the high speed clock phases, as noted above. Accordingly, timing skew problems due to variations in parasitic (resistance-capacitance) RC delays are avoided. In addition, different clock modes may be implemented so that different portions of processor 200 may be operating at different frequencies. For example, CPU core 202 may be operating at a slower frequency, due to its relative inactivity at times, relative to BC 208.

4. Clock Synchromesh Operation

As described hereinabove relative to FIG. 2a, clock generator 270 receives control inputs from several functional units within processor 200, based upon which clock generator 270 adjusts the frequency of the clock signals presented to CPU core 202, BC 208, and elsewhere within processor 200.

Figure 12:
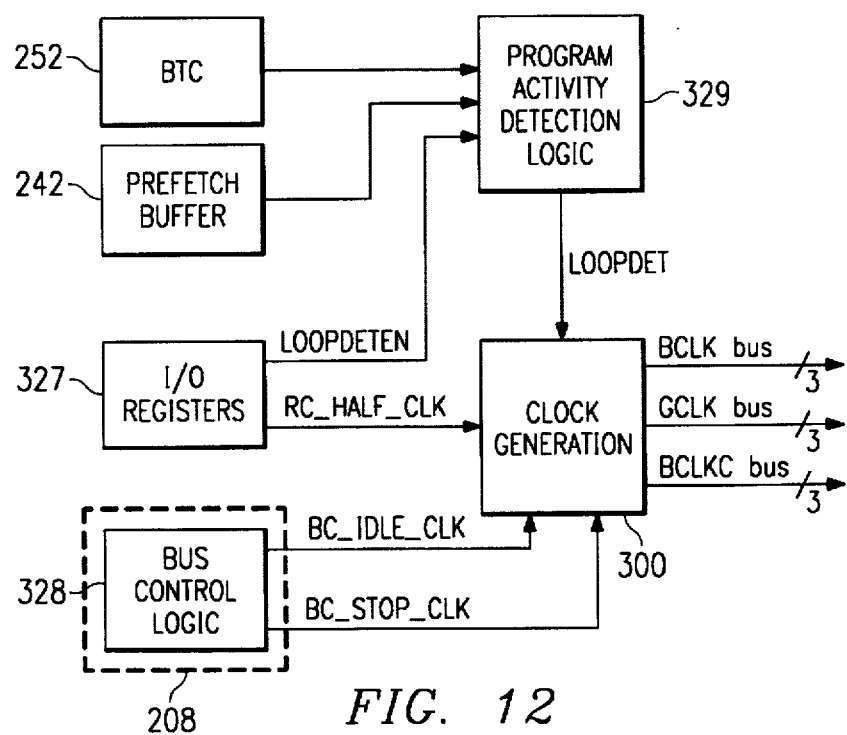

Reference is now made to FIG. 12 which depicts specific control inputs to clock generation circuitry 300 for controlling the clock synchromesh. Clock generation circuitry 300 receives control inputs on line RC_HALF_CLK from I/O registers 327, on lines BC_IDLE_CLK and BC_STOP_CLK from bus control logic circuitry 328 in BC 208, and on line LOOPDET from program activity detection circuitry 329. Program activity detection circuitry 329 receives inputs from the BTC 252 and the prefetch buffer 242, as described in further detail hereinbelow from which it determines if CPU core 202 has been operating in a repetitive loop without memory activity and the like. Program activity detection circuitry 329 receives an enable input on line LOOPDETEN from I/O registers 327 to enable such determinations, with the enabling being programmably controlled. For example, there may be repetitive operations of CPU core 202 that are in fact part of an essential, critical path, mathematical operation, and thus the clock rate must not be reduced. An example of such operations may be repeated multiply and accumulate operations such as performed in a Discrete Fourier Transform (DFT).

Based on these inputs, clock generation circuitry 300 controls the frequency of internal clock signals in three different ways, namely (i) under soft, rare control, (ii) in response to bus activity, and (iii) in response to an internal heuristic that watches for core activity and determines if "idle" loops are being executed (i.e., loops for which the clock frequency may be reduced).

4.1 Software Control

As depicted in FIG. 12, I/O registers 327 generate a signal on line RC_HALF_CLK to clock generation circuitry 300, such that the clock frequency is slowed, for example to ½× frequency operation, under software control. This software control is accomplished by performing a write operation to a predetermined register. Software control is also provided, by way of register write instructions, to enable various types of program activity monitoring based upon which the frequency of the clock signals may be controlled. For example, program activity monitoring may be disabled totally, or may be enabled to perform automatic loop and branch heuristic detection as will be described hereinbelow, by a write to a dedicated register.

Another dedicated register is also preferably provided by way of which certain types of operations (e.g., internal memory write operations) may be either included in or excluded from the determination of an idle loop. Another dedicated register is also preferably provided by way of which the number of iterations of an idle loop required prior to clock slowdown may be set, under software control. Furthermore, another set of dedicated registers may be provided by way of which a specific loop signature node is stored, described in more detail hereinbelow. The loop signature is the means by which the determination of a repetitively executed idle loop is made.

4.2 Bus Activity Control

Activity between processor 200 and the external P-Bus may be monitored and the various internal clocks controlled responsive thereto. According to this embodiment of the invention, bus activity as detected by bus control logic 328 within the BC 208 causes clock generator 270 to increase the frequency of the bus clock if it has already been slowed in the event that bus activity, such as memory reads and writes, is occurring. For example, when operating in idle cycles, CPU core 202 will not be performing external bus operations. After some period of bus inactivity, bus control logic 328 asserts control line BC_IDLE_CLK, which enables clock generation circuitry 300 to reduce the core clock frequency as indicated by the program activity detection logic circuitry 329. However, in the event that bus activity occurs, bus control logic 328 de-asserts control line BC_IDLE_CLK, disabling the reduced frequency operation of CPU core 202 so that CPU core 202 (and such other appropriate portions of processor 200) operates at clock rates that keep up with bus activity and appropriate for the activity level.

Bus control logic 328 also communicates signals on control line BC_STOP_CLK indicating to clock generation circuitry 300 that core clock signal GCLK may be stopped altogether, based on the lack of bus activity from CPU core 202 over a selected elapsed time.

4.3 Internal Heuristic For Idle Cycles

As described hereinabove, processor 200 is operable to detect "idle" loops being executed by CPU core 202. Such idle cycles include execution loops in which the CPU core 202 is "stuck", and other activity for which it is inefficient for CPU core 202 to continue operation at high frequency. Idle loops consist of a series of branch nodes that are repeatedly executed beyond a threshold number of times. The threshold value is preferably set by a write to one of the I/O registers 327, as described hereinabove.

Figure 13:
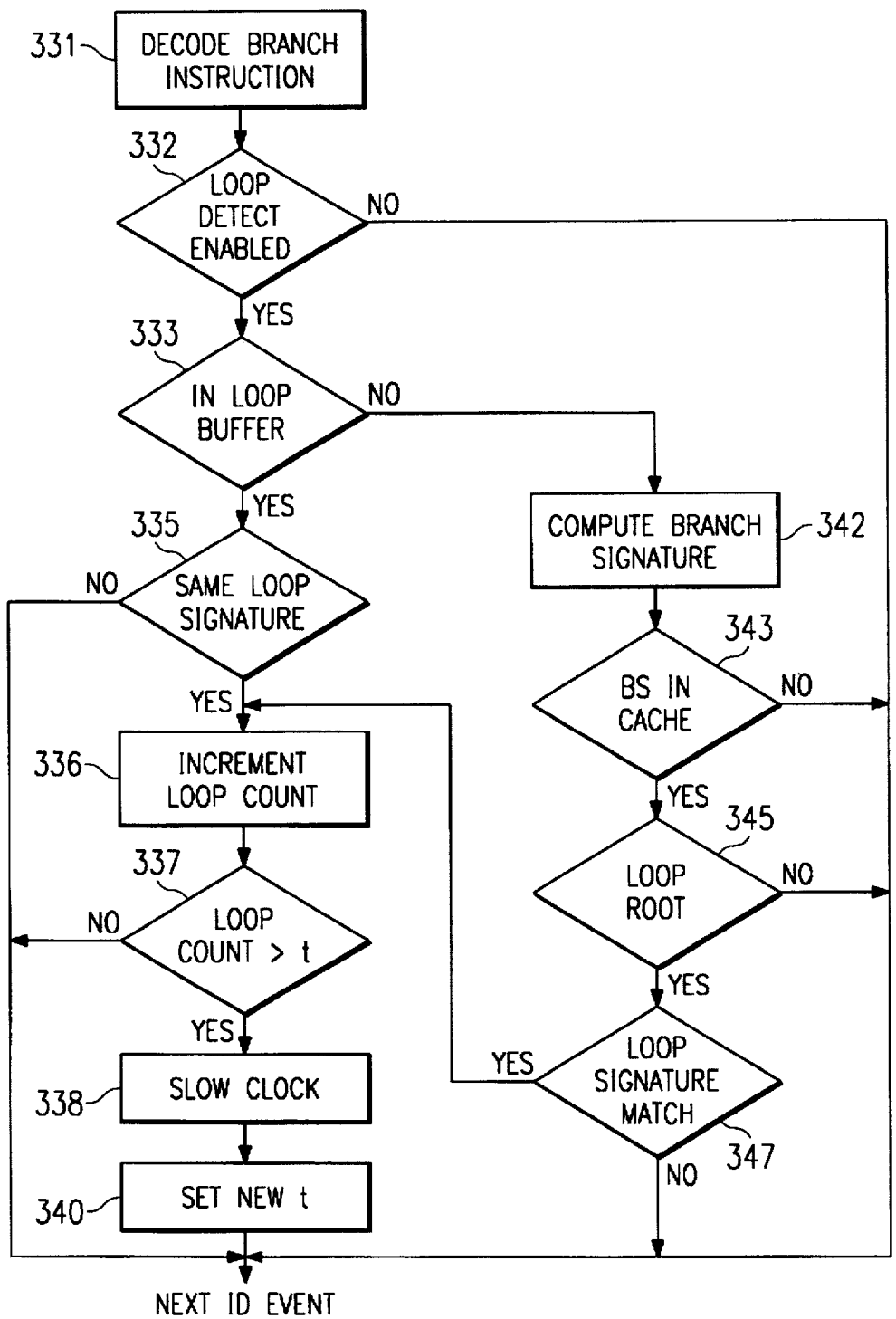
FIG. 13 is a flow chart illustrating the operation of the control circuitry depicted in FIG. 12.
Figure 14:
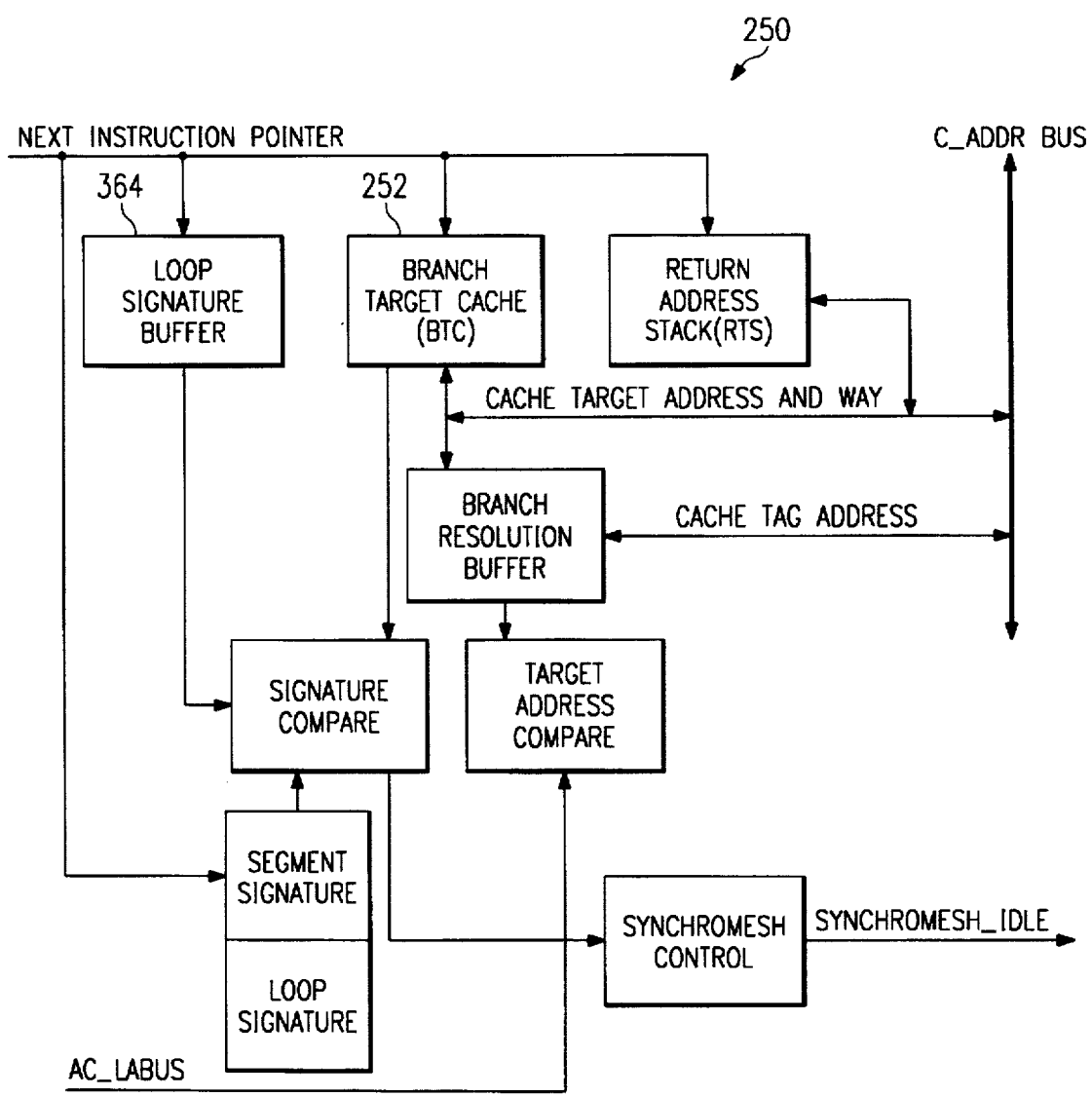

Reference is now made to FIG. 13 which depicts a flow diagram of the general operation of processor 200 in the context of the clock synchromesh. Throughout appropriate portions of this description, the construction of specific circuitry in program activity monitoring logic circuitry 329 is discussed for clarity. At step 331, ID 211 (FIG. 2a) decodes and detects certain types of branching instructions and issues a signal to program activity monitoring logic circuitry 329 indicating the same. Branching instructions for which such indication is provided include any backward branch (i.e. the destination address is less than the program counter). Decision step 332 is then performed by program activity monitoring logic circuitry 329 to determine if loop detection has been enabled (via control line LOOPDETEN from I/O registers 327). If not, control (insofar as program activity monitoring logic circuitry 329 is concerned) passes to the next ID event. If loop detection is enabled, however, decision step 333 is performed by program activity monitoring logic circuitry 329 to determine whether or not the branch is within the range of the prefetch buffer 242. If the branch is within the range of the prefetch buffer 242, interrogation of the prefetch buffer 242 and signature proceeds. If not, branch signature processing is required in order to determine whether an idle loop is in process. The circuitry within program activity monitoring logic circuitry 329 for accomplishing each of these sequences is now described relative to its corresponding sequence.

5. Prefetch Buffer

The prefetch buffer 242 is a buffer containing several (e.g. 128) eight-bit entries, addressable on a byte-wise or word-wise basis, depending upon the number of instructions to be decoded. While the details of prefetch buffer 242 are not necessary for the understanding of the present invention, the preferred embodiment is described in commonly assigned and co-pending U.S. patent application Ser. No. 08/572,948, entitled "Prefetch Unit With A Three-Block Prefetch Buffer And Virtual Buffer Management including Selectively Allocating A Prefetch Buffer For A Branch Target Or The Not-Predicted Path", filed contemporaneously herewith and the disclosure herein incorporated by reference.

Referring again to FIG. 13, upon detection of a backward branch within prefetch buffer 242, decision step 335 is performed to identify if the loop signature of the current branch is the same as one which has been recently performed (i.e. within the last "n", branches, where n is the size of a buffer storing loop signatures). The loop signature in the preferred embodiment, is a byte generated by use of a linear feedback shift register (LFSR) applied by prefetch buffer 242 to ID 211, which includes the destination of the branch and the number of instructions to be decoded. If the loop signature calculated by program activity monitoring logic circuitry 329 is the same as a loop signature previously calculated (i.e. decision step 335 returns YES), a loop counter within program activity monitoring logic circuitry 329 is incremented in step 336. If not, the loop detection flow is exited.

After the loop counter is incremented, the contents "LC" are compared against a threshold value t in decision step 337 to determine if the number of passes through this loop have exceeded the threshold value at which clock rates may be reduced. If not, control passes to the next instruction decode operation. If loop counter contents LC exceed this threshold t, program activity monitoring logic circuitry 329 presents a control signal to clock generation circuitry 300 to reduce the clock rate, either for CPU core 202 or BC 208, or both as the case may be, in step 338.

According to this embodiment of the invention, capability for "ratcheting" of the clock frequency is available through the clock synchromesh. That is, the clock rate is reduced gradually, depending upon the number of passes through the same idle loop. This allows for the power dissipation of processor 200 to be minimized when the idle loop has been executed an excessive number of times, while ensuring that loops that only appear idle (but in fact are performing useful operations in a looped manner) are still performed with some efficiency (i.e., clock rates that are still somewhat fast). As depicted in FIG. 13, these operations are accomplished by step 340, in which a new threshold value t is set for the loop counter which, when exceeded, will effect still a further slowdown in the internal clock frequencies. Control then passes to the next instruction decode of a branch, prior to repetition of this process.

6. Branch Loop Detection

As depicted above, decision step 333 may determine that the detected branch operation is outside the range of the prefetch buffer 242. Program activity monitoring logic circuitry 329 includes circuitry for operating in conjunction with BU 250 to determine if branching instructions constitute an idle loop, and thus for which the clock rate may be reduced according to the preferred embodiment of the invention. The processor 200 includes BU 250, as noted above, which is used to predict whether certain conditional branches are to be taken or not taken, so that the pipe stages in superpipelined operation of processor 200 can continue to remain filled in most cases. While the details of BU 250 are not necessary for the understanding of the present invention, the preferred embodiment is described in commonly assigned and co-pending U.S. patent application Ser. No. 08/572,815, entitled, "Branch Target Cache Storing The L1 Cache Index For A Target", filed contemporaneously herewith and the disclosure herein incorporated by reference.

Figure 15:
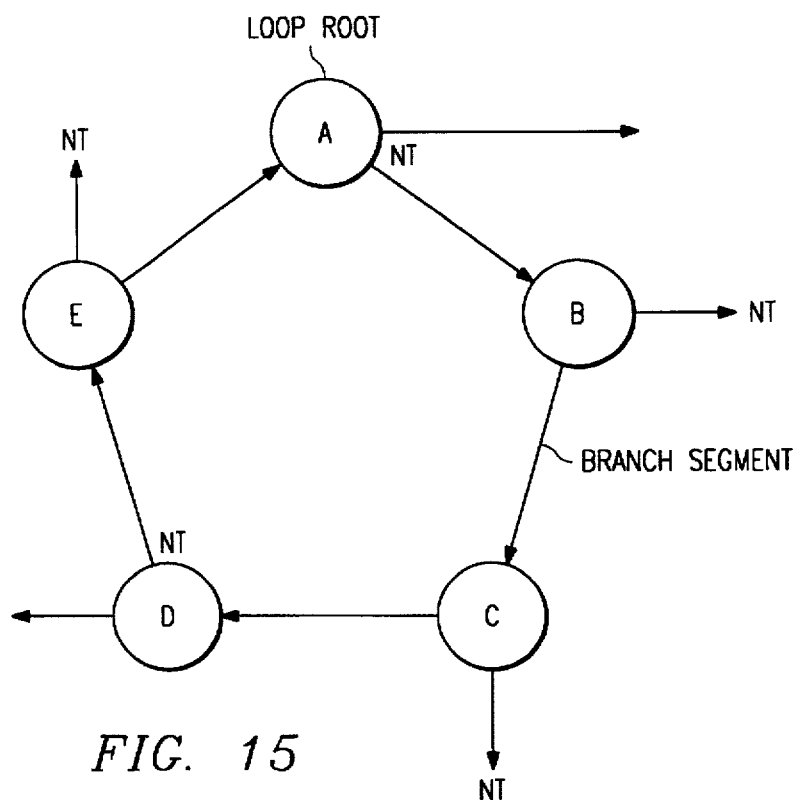
FIG. 15 is a schematic representation of a sequence of branch nodes comprising an idle loop.

Reference is now made to FIG. 15 which depicts a typical sequence of branches amounting to a loop. The loop includes (among other instructions not depicted) five "nodes" A through E, each corresponding to a conditional branch instruction. Each conditional branch node has two possible paths emanating therefrom, with the "not taken" (i.e. failure to satisfy the condition) path marked NT. In this example, node A is indicated as the "loop root" (the significance of which will be described hereinbelow), with nodes B through E being subsequently executed conditional branches that eventually return to loop root node A. By way of terminology, each path between nodes in the loop (which may consist of several instructions) is referred to as a segment. A loop consisting of branches such as depicted in FIG. 15 may not qualify as an idle loop unless the branch nodes executed between each occurrence of the loop root are the same (i.e., the branch segments must be identical).

Reference is now made to FIGS. 13-16 for methodology and circuitry in determining whether branch nodes executed between each occurrence of the loop root are the same. The BTC 252 includes an entry 357 namely the branch signature, for each branch node considered by BU 250. Each entry includes a branch address 358, a prediction flag 359, a segment signature 360, a loop counter 361, an S bit 362, and a SV bit 363.

Referring specifically to FIG. 13, step 342 is performed once a branch is decoded but determined not be within the range of the prefetch buffer 242. Step 342 computes the loop signature, for storage in BTC 252, including the segment signature 360 produced by way of, for example, adding the bits of the instruction pointer to which the branch segment is predicted to pass control. Decision step 343 is then performed, by comparing the newly computed segment signature 360 to that previously stored for this branch entry in the loop signature buffer 364. The comparison is performed by comparator 350 in FIG. 16. If, at this point, either the segment signature 360 does not match that stored in the BTC 252 (either this branch node has not been previously encountered, or else the instruction pointer differs), no loop is yet detected. The new segment signature 360 is stored in the BTC 252. The valid (V) bit is set and the SV bit 363 is cleared. Control then passes, for purposes of program activity monitoring logic circuitry 329, to the next ID stage.

Figure 16:
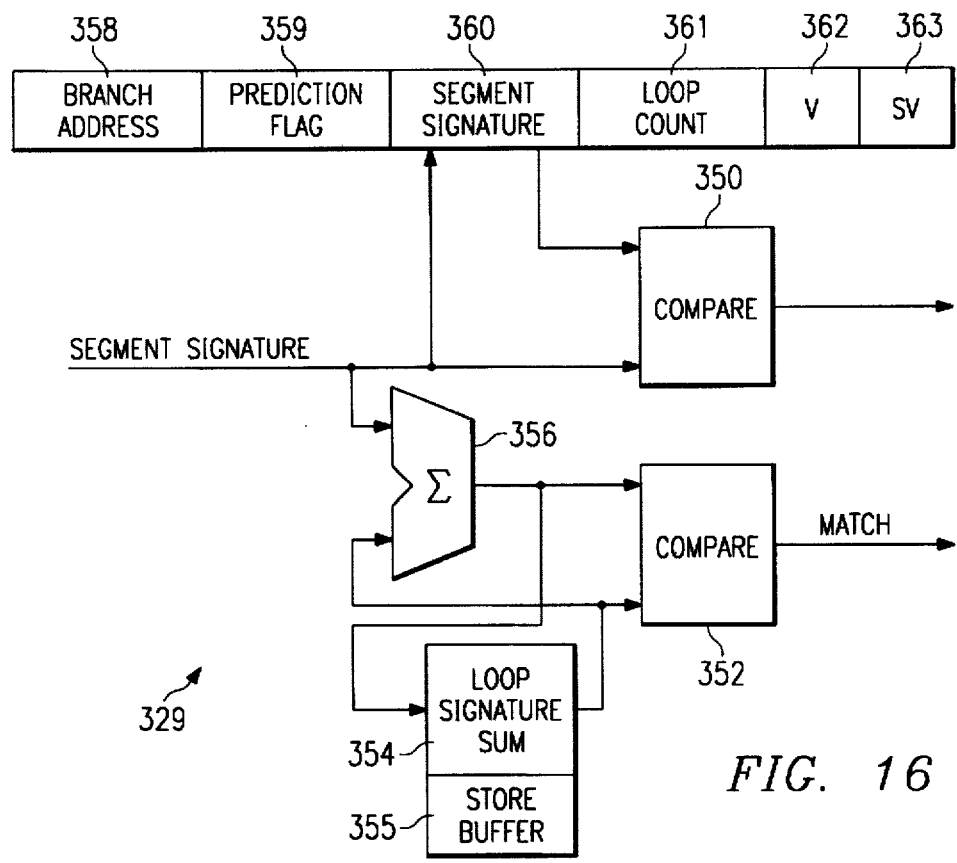
FIG. 16 is a block diagram of logic circuitry for detecting idle loops as sequences of branch nodes; and, FIG. 17 is a block diagram of a distributed clock scheme, practiced in accordance with the principles of the present invention.

If a match is found, however, the SV bit 363 is set, if not already set, for this particular entry. Decision step 345 is then performed to determine if this branch node is a loop root (i.e. was it the first entry in a sequence to have its SV bit 363 set). If not, control passes to the next ID stage. If this particular node is the loop root, however, according to the present invention the sum of the segment addresses is interrogated to determine if the same series of branch segments have again been encountered. As depicted in FIG. 16, program activity monitoring logic circuitry 329 includes loop signature summing circuitry 354, which sums the series of segment addresses encountered in each loop, and adder 356 which computes the sum of the current segment signature with the previous sum of segment addresses stored by summing circuitry 354. The current segment signature is added to the prior loop signature from 354 to form the new loop signature for this segment, with the loop signature cleared each time that the root node is found.

This operation is best explained by way of example. Assume that the sequence of branches depicted in FIG. 15 constitutes the loop. Each time that loop root is encountered, the loop signature summing circuitry 354 is cleared, but the original loop signature is saved. Upon encountering the loop root, the loop signature summing circuitry 354 is cleared, while the value of the loop signature is stored in store buffer 355. The instruction pointer of each branch in the sequence (i.e., branches B through E) are then summed together as execution of the loop continues. At the next time that the loop root of node A is encountered, the instruction pointer of node A is summed, by adder 356, with the sum of the previous nodes, instruction pointers (B+C+D+E). In step 347 of FIG. 13, this value (A+B+C+D+E) is compared against the loop signature in store buffer 355. If the two match, indicating that the sum of segment signatures (i.e., instruction pointers) is the same for this pass as in the previous pass through the sequence, program activity monitoring logic circuitry 329 issues a signal on control line MATCH, and control passes to step 336 in which the loop counter 361 for loop root node A is incremented.

As before, if the value of the loop counter exceeds a threshold, the clock rates are slowed by the desired factor. A new threshold is then selected, if appropriate, and the process continues. Alternatively, as was noted above, reduced frequency operation may be enabled in a non-automatic way, for example by writing a specific loop signature for a branch node into the appropriate one of I/O registers 327. In this alternative approach, the loop signatures are calculated in the manner described above and, if a match is found between the newly calculated signature and that stored in the register, the loop counter is incremented and the clock frequency reduced, in the manner described hereinabove.

As noted above, upon exiting of the idle loop, generally indicated by bus activity and thus by bus control logic 328 de-asserting control line BC_IDLE_CLK, the reduced frequency operation of CPU core 202 will be disabled, and the core clock GCLK returned to the maximum operating frequency, so as to keep up with bus activity and efficiently perform the now essential operations.

Accordingly, whether in the case of a loop within prefetch buffer 242 or a sequence of conditional branches as detected by BU 250, an internal heuristic of processor 200 is capable of controlling the frequency of the internal clock signals so as to gradually slow the clock rate upon detection that non-essential idle loop activity is being performed by CPU core 202. The power savings provided by such automatic clock frequency reduction according to the present invention can be substantial, especially at main clock frequencies of 100 MHz or greater. As such, processor 200 according to this embodiment of the invention is especially useful in power-sensitive applications such as notebook computers, personal digital assistants, and other portable, battery-powered, computing systems but also having application to multimedia presentation systems, virtual reality simulators, home theater systems, interactive video cassette and disk players, video conferencing equipment and the like.

7. Conclusion

Although the Detailed Description of the invention has been directed to a certain exemplary embodiment, various modifications of this embodiment, as well as alternative embodiments, will be suggested to those skilled in the art. The invention encompasses any modifications or alternative embodiments that fall within the scope of the Claims.

What is claimed is:

1. A static clock generator comprising:
   (a) an edge detector having an input coupled to receive an initiating clock signal and an output;
   (b) a logical OR gate having first and second inputs and an output, the first input coupled to the output of the edge detector;
   (c) a delay line having a signal input, at least one control input, an output, and a tap between the input and the output, the output being coupled to the second input on the logical OR gate; and,
   (d) control logic circuitry having a plurality of inputs and at least one control output, a first input being coupled to the tap on the delay line, a second input being coupled to output of the delay line, the at least one control output being coupled to the at least one control input on the delay line.

2. A static clock generator comprising:
   (a) edge detect means for detecting a transition of an initiating clock signal;
   (b) logical OR means, coupled to the edge detect means, for generating an output;
   (c) delay line means, coupled to the logical OR means, for delaying the output and returning a regenerative feedback signal; and,
   (d) control logic means, coupled to the delay line means, for adjusting the delay line means to produce an output clock signal of desired frequency and duty cycle.

3. A method of static clock generation comprising steps of:
   (a) detecting a transition of an initiating clock signal and generating a pulse in response thereto;
   (b) logically ORing the pulse from step (a) with a regenerative feedback signal from step (c) to produce an output;
   (c) delaying the output from step (b) an adjustable delay time t and returning a regenerative feedback signal to step (b); and,
   (d) adjusting the delay time t to produce an output clock signal of desired frequency and duty cycle.

4. A computer system comprising:
   (a) a motherboard;
   (b) memory disposed on the motherboard; and,
   (c) a processor disposed on the motherboard coupled to the memory and including a static clock generator having,
      (i) an edge detector having an input coupled to receive an initiating dock signal and an output;
      (ii) a logical OR gate having first and second inputs and an output, the first input coupled to the output of the edge detector;

(iii) a delay line having a signal input, at least one control input, an output, and a tap between the input and the output, the output being coupled to the second input on the logical OR gate; and, (iv) control logic circuitry having a plurality of inputs and at least one control output, a first input being coupled to the tap on the delay line, a second input being coupled to output of the delay line, the at least one control output coupled to the at least one control input on the delay line.

5. In a computer having a motherboard, a processor, and system memory external to the processor, a method of static clock generation comprising steps of:

(a) retrieving instructions from system memory;

(b) executing the instructions with the processor;

(c) detecting a transition of an initiating input clock signal to the processor and generating an internal pulse in response thereto;

(d) logically ORing the pulse from step (c) with a regenerative feedback signal from step (e) to produce an output;

(e) delaying the output from step (d) an adjustable delay time t and returning a regenerative feedback signal to step (d); and, (f) adjusting the delay time t to produce an output clock signal of desired frequency and duty cycle.

* * * * *